US010546402B2

(12) United States Patent
Nakata

(10) Patent No.: US 10,546,402 B2
(45) Date of Patent: Jan. 28, 2020

(54) INFORMATION PROCESSING SYSTEM, INFORMATION PROCESSING TERMINAL, AND INFORMATION PROCESSING METHOD

(71) Applicant: SONY CORPORATION, Tokyo (JP)

(72) Inventor: Masashi Nakata, Kanagawa (JP)

(73) Assignee: Sony Corporation, Tokyo (JP)

(*) Notice: Subject to any disclaimer, the term of this patent is extended or adjusted under 35 U.S.C. 154(b) by 230 days.

(21) Appl. No.: 15/312,268

(22) PCT Filed: Apr. 16, 2015

(86) PCT No.: PCT/JP2015/061759
§ 371 (c)(1),
(2) Date: Nov. 18, 2016

(87) PCT Pub. No.: WO2016/002306
PCT Pub. Date: Jan. 7, 2016

(65) Prior Publication Data
US 2017/0161929 A1 Jun. 8, 2017

(30) Foreign Application Priority Data
Jul. 2, 2014 (JP) ................................. 2014-136553

(51) Int. Cl.
G06F 13/00 (2006.01)
G06F 3/0481 (2013.01)
(Continued)

(52) U.S. Cl.
CPC .............. *G06T 11/60* (2013.01); *G06T 5/002* (2013.01); *H04L 51/04* (2013.01);
(Continued)

(58) Field of Classification Search
CPC . G06T 11/60; G06T 5/002; G06T 7/60; G06T 7/73; G06T 7/90; H04L 51/04; H04N 5/272; H04N 5/23212; H04N 5/23293
See application file for complete search history.

(56) References Cited

U.S. PATENT DOCUMENTS 4,792,819 A * 12/1988 Akashi ..................... G02B 7/36
396/104
4,924,250 A * 5/1990 Hamada ................... G02B 7/34
396/135
(Continued)

FOREIGN PATENT DOCUMENTS

CN 101874404 A 10/2010
CN 102547131 A 7/2012
(Continued)

OTHER PUBLICATIONS

International Search Report and Written Opinion of PCT Application No. PCT/JP2015/061759, dated Jul. 14, 2015, 2 pages of English Translation and 9 pages of ISRWO.

Primary Examiner — Philip P. Dang
(74) Attorney, Agent, or Firm — Chip Law Group

(57) ABSTRACT

[Object] To provide an information processing system capable of transmitting a message with a state of a user at the time of inputting the message, to another user. [Solution] The information processing system includes: a message acquisition unit configured to acquire messages input by users; a related information acquisition unit configured to use an imaging device and acquire information related to the user who has input the message; and a control unit configured to control information processing to transmit the input message on the basis of the information related to the user.

16 Claims, 24 Drawing Sheets

(51) Int. Cl.
    *G06T 11/60*        (2006.01)
    *G06T 5/00*         (2006.01)
    *H04L 12/58*        (2006.01)
    *H04N 5/232*        (2006.01)
    *G06T 7/73*             (2017.01)
    *G06T 7/90*             (2017.01)
    *G06T 7/60*             (2017.01)
    *H04N 5/272*            (2006.01)

(52) U.S. Cl.
    CPC ..... *H04N 5/23212* (2013.01); *H04N 5/23293* (2013.01); *G06T 7/60* (2013.01); *G06T 7/73* (2017.01); *G06T 7/90* (2017.01); *H04N 5/272* (2013.01)

(56) References Cited

U.S. PATENT DOCUMENTS

| | | | | |
|---|---|---|---|---|
| 5,118,943 A * | 6/1992 | Le Bars | H04N 5/33 | 250/252.1 |
| 5,469,240 A * | 11/1995 | Uchiyama | G02B 7/346 | 396/104 |
| 5,600,397 A * | 2/1997 | Shiokama | G02B 7/28 | 396/133 |
| 5,687,409 A * | 11/1997 | Miyamoto | G03B 17/20 | 396/121 |
| 6,542,749 B2 * | 4/2003 | Tanaka | H04W 76/40 | 455/456.1 |
| 6,542,750 B2 * | 4/2003 | Hendrey | H04W 76/40 | 455/456.1 |
| 6,763,226 B1 * | 7/2004 | McZeal, Jr. | H04B 7/18595 | 455/90.2 |
| 7,102,634 B2 * | 9/2006 | Kim | G06T 15/08 | 345/419 |
| 7,174,031 B2 * | 2/2007 | Rhoads | G06Q 30/02 | 382/107 |
| 7,289,506 B1 * | 10/2007 | Hannuksela | H04N 21/234327 | 370/394 |
| 7,358,999 B2 * | 4/2008 | Ikeda | H04N 5/2254 | 348/241 |
| 7,430,008 B2 * | 9/2008 | Ambiru | H04N 5/23293 | 348/333.01 |
| 7,558,709 B2 * | 7/2009 | Subbarao | G05B 17/02 | 703/2 |
| 7,586,635 B2 * | 9/2009 | Maeda | H04N 1/00204 | 358/1.1 |
| 7,602,435 B2 * | 10/2009 | Ishii | H04N 5/232 | 348/345 |
| 7,634,354 B2 * | 12/2009 | Salmre | G01C 21/20 | 340/995.1 |
| 7,643,560 B2 * | 1/2010 | Hong | H04N 21/242 | 375/240.25 |
| 7,836,477 B2 * | 11/2010 | Kuwata | G06F 17/30876 | 348/207.1 |
| 7,876,374 B2 * | 1/2011 | Sako | A63F 13/12 | 348/333.01 |
| 7,929,951 B2 * | 4/2011 | Stevens | G06Q 20/04 | 455/414.1 |
| 7,991,236 B2 * | 8/2011 | Guo | H04N 19/30 | 382/238 |
| 8,111,247 B2 * | 2/2012 | Thorn | H04N 5/23219 | 345/173 |
| 8,159,599 B2 * | 4/2012 | Takamiya | H04N 5/23212 | 348/345 |
| 8,170,116 B2 * | 5/2012 | Wang | H04N 19/70 | 375/240.25 |
| 8,189,088 B2 * | 5/2012 | Nagata | H04N 5/23209 | 348/335 |
| 8,204,513 B2 * | 6/2012 | Crowley | H04M 3/42 | 455/456.3 |
| 8,228,399 B2 * | 7/2012 | Hwang | H04N 5/232 | 348/231.99 |
| 8,315,308 B2 * | 11/2012 | Bao | H04N 19/105 | 375/240.12 |
| 8,325,214 B2 * | 12/2012 | Hildreth | H04N 7/147 | 348/14.03 |
| 8,391,136 B1 * | 3/2013 | Eidelson | H04L 51/32 | 370/228 |
| 8,396,134 B2 * | 3/2013 | Hong | H04N 19/105 | 375/240.12 |
| 8,463,006 B2 * | 6/2013 | Prokoski | A61B 5/0064 | 382/128 |
| 8,489,598 B2 * | 7/2013 | Rhoads | G06F 3/017 | 707/736 |
| 8,525,912 B2 * | 9/2013 | Yoon | H04N 5/23293 | 348/333.01 |
| 8,532,378 B2 * | 9/2013 | Sawada | H04N 5/2251 | 382/167 |
| 8,559,808 B2 * | 10/2013 | Ueda | G03B 13/36 | 348/333.02 |
| 8,564,693 B2 * | 10/2013 | Makii | H04N 5/23293 | 348/239 |
| 8,601,061 B2 * | 12/2013 | Piccinini | H04L 65/1063 | 709/205 |
| 8,634,031 B2 * | 1/2014 | Ikeda | H04N 5/4403 | 340/12.22 |
| 8,643,737 B2 * | 2/2014 | Eom | H04N 5/23293 | 348/222.1 |
| 8,649,824 B2 * | 2/2014 | Choi | H04M 1/72583 | 455/566 |
| 8,659,619 B2 * | 2/2014 | Cannon | G06T 11/60 | 345/619 |
| 8,670,063 B2 * | 3/2014 | Wakamiya | H04N 5/3696 | 348/349 |
| 8,675,109 B2 * | 3/2014 | Choi | H04N 5/23293 | 348/222.1 |
| 8,730,373 B2 * | 5/2014 | Egawa | G02B 7/34 | 348/175 |
| 8,732,091 B1 * | 5/2014 | Abhyanker | H04L 63/08 | 705/1.1 |
| 8,738,545 B2 * | 5/2014 | Abhyanker | H04W 4/021 | 705/325 |
| 8,751,973 B2 * | 6/2014 | Han | G06F 3/017 | 715/810 |
| 8,757,904 B2 * | 6/2014 | Hasuda | G03B 17/14 | 396/530 |
| 8,761,794 B2 * | 6/2014 | Rekimoto | H04L 63/0407 | 455/456.1 |
| 8,831,677 B2 * | 9/2014 | Villa-Real | H04M 1/66 | 455/552.1 |
| 9,538,137 B2 * | 1/2017 | Lu | H04N 21/2343 | |
| 9,635,396 B2 * | 4/2017 | Wang | H04N 21/234327 | |
| 9,813,722 B2 * | 11/2017 | Hannuksela | H04N 19/70 | |
| 9,813,736 B2 * | 11/2017 | Chen | H04N 19/597 | |
| 9,924,189 B2 * | 3/2018 | Nakagami | H04N 19/137 | |
| 10,070,125 B2 * | 9/2018 | Hannuksela | H04N 19/70 | |
| 10,116,948 B2 * | 10/2018 | Deshpande | H04N 19/70 | |
| 2002/0037046 A1 * | 3/2002 | Schaar | H04N 19/61 | 375/240.2 |
| 2004/0064834 A1 * | 4/2004 | Kuwata | H04N 1/00209 | 725/86 |
| 2006/0101116 A1 * | 5/2006 | Rittman | H04L 12/1813 | 709/204 |
| 2006/0262365 A1 * | 11/2006 | Imao | H04N 5/232 | 358/527 |
| 2007/0086521 A1 * | 4/2007 | Wang | H04N 21/23406 | 375/240.1 |
| 2007/0097147 A1 * | 5/2007 | Inata | G06T 11/60 | 345/619 |
| 2007/0160133 A1 * | 7/2007 | Bao | H04N 19/105 | 375/240.1 |
| 2008/0089411 A1 * | 4/2008 | Wenger | H04N 19/105 | 375/240.12 |
| 2008/0165848 A1 * | 7/2008 | Ye | H04N 19/105 | 375/240.13 |
| 2008/0201434 A1 | 8/2008 | Holmes et al. | | |
| 2008/0205529 A1 * | 8/2008 | Hannuksela | H04N 19/37 | 375/240.26 |

(56) References Cited

U.S. PATENT DOCUMENTS

| | | |
|---|---|---|
| 2009/0079813 A1 | 3/2009 | Hildreth |
| 2009/0245347 A1* | 10/2009 | Lee ............... H04N 19/597 375/240.01 |
| 2009/0290648 A1* | 11/2009 | Onno ............ H04N 21/23424 375/240.27 |
| 2010/0124271 A1* | 5/2010 | Martz ............. H04N 7/17336 375/240.01 |
| 2010/0135393 A1* | 6/2010 | Ying Gao ........... H04N 19/61 375/240.15 |
| 2010/0142622 A1* | 6/2010 | Le Leannec ....... H04N 19/147 375/240.16 |
| 2010/0302409 A1* | 12/2010 | Matas ................. H04N 5/772 348/231.99 |
| 2011/0249083 A1 | 10/2011 | Allegro |
| 2011/0301433 A1 | 12/2011 | Sadowsky et al. |
| 2012/0063516 A1* | 3/2012 | Kwon ................. H04N 19/56 375/240.16 |
| 2012/0113138 A1* | 5/2012 | Uusitalo ............ G06Q 10/047 345/629 |
| 2012/0147212 A1 | 6/2012 | Hara et al. |
| 2012/0163472 A1* | 6/2012 | Sole Rojals ........ H04N 19/176 375/240.24 |
| 2012/0183077 A1* | 7/2012 | Hong ................. H04N 19/70 375/240.25 |
| 2012/0201301 A1* | 8/2012 | Bao ................. H04N 19/105 375/240.14 |
| 2012/0269275 A1* | 10/2012 | Hannuksela ....... H04N 13/0048 375/240.25 |
| 2012/0275517 A1* | 11/2012 | Boyce ................ H04N 19/70 375/240.12 |
| 2013/0010871 A1* | 1/2013 | Kwon ................. H04N 19/33 375/240.16 |
| 2013/0034170 A1* | 2/2013 | Chen .................. H04N 13/00 375/240.25 |
| 2013/0150093 A1* | 6/2013 | Seol ................... H04N 5/232 455/457 |
| 2013/0235152 A1* | 9/2013 | Hannuksela ........ H04N 19/597 348/43 |
| 2013/0250111 A1* | 9/2013 | Watanabe ........ H04N 5/23293 348/148 |
| 2013/0272606 A1* | 10/2013 | Nakamura .......... G06K 9/4652 382/167 |
| 2013/0321648 A1* | 12/2013 | Tamiya ............. H04N 5/23222 348/207.1 |
| 2014/0003527 A1* | 1/2014 | Tourapis ........... H04N 19/147 375/240.16 |
| 2014/0053086 A1* | 2/2014 | Kim .................. H04L 65/403 715/753 |
| 2014/0092978 A1* | 4/2014 | Bugdayci ............ H04N 19/30 375/240.16 |
| 2014/0160248 A1* | 6/2014 | Pomerantz ........... G06F 1/163 348/47 |
| 2014/0181228 A1* | 6/2014 | Cho ................ H04L 67/1095 709/206 |
| 2014/0218473 A1* | 8/2014 | Hannuksela ........ H04N 19/597 348/43 |
| 2014/0218517 A1* | 8/2014 | Kim .................. H04L 12/2818 348/143 |
| 2015/0092837 A1* | 4/2015 | Chen ................. H04N 19/597 375/240.02 |
| 2015/0245063 A1* | 8/2015 | Rusanovskyy ...... H04N 19/597 375/240.12 |
| 2015/0365687 A1* | 12/2015 | Le Floch ............ H04N 19/17 375/240.24 |
| 2016/0029091 A1* | 1/2016 | Le Floch ....... H04N 21/234345 375/240.26 |
| 2016/0234144 A1* | 8/2016 | Hannuksela .......... H04L 51/063 |
| 2017/0171563 A1* | 6/2017 | Deshpande ........... H04N 19/70 |
| 2017/0238061 A1* | 8/2017 | Deshpande ....... H04N 21/4852 725/139 |

FOREIGN PATENT DOCUMENTS

| | | |
|---|---|---|
| CN | 102933136 A | 2/2013 |
| EP | 2464101 A2 | 6/2012 |
| JP | 2005-18262 A | 1/2005 |
| JP | 2005-276103 A | 10/2005 |
| JP | 2007-295489 A | 11/2007 |
| JP | 2010-519609 A | 6/2010 |
| JP | 2010-197311 A | 9/2010 |
| JP | 2010-541398 A | 12/2010 |
| JP | 2012-513693 A | 6/2012 |
| JP | 2012-129627 A | 7/2012 |
| JP | 2014-501967 A | 1/2014 |
| KR | 10-2009-0115790 A | 11/2009 |
| KR | 10-2013-0122535 A | 11/2013 |
| WO | 2008/100690 A1 | 8/2008 |
| WO | 2009/042579 A1 | 4/2009 |
| WO | 2010/072945 A1 | 7/2010 |

\* cited by examiner

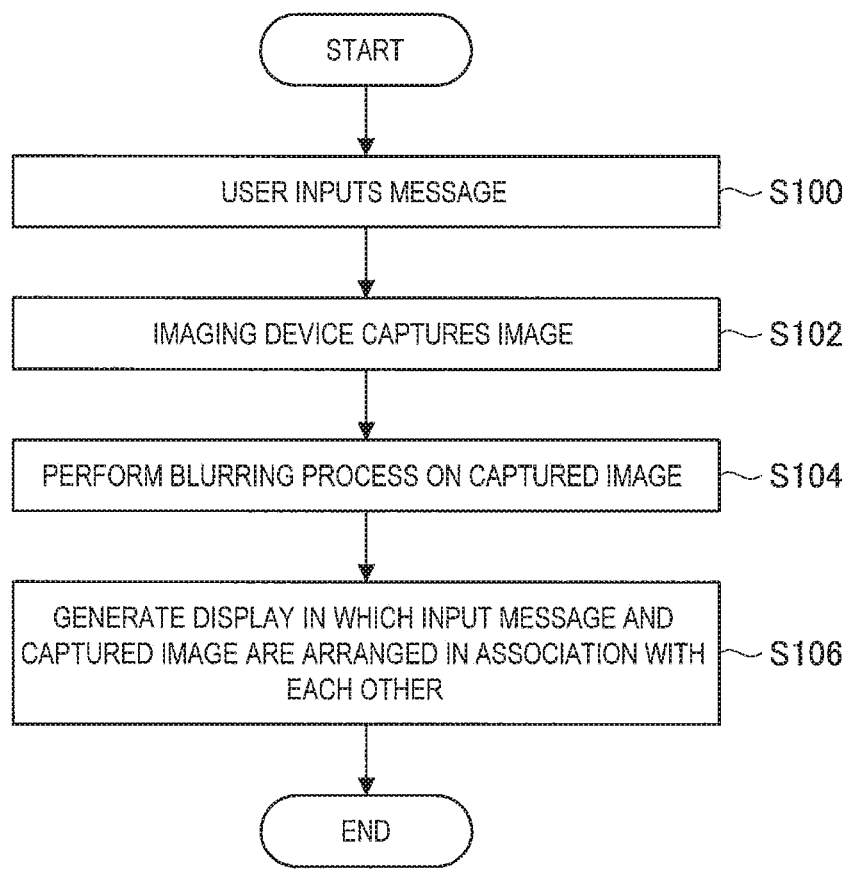

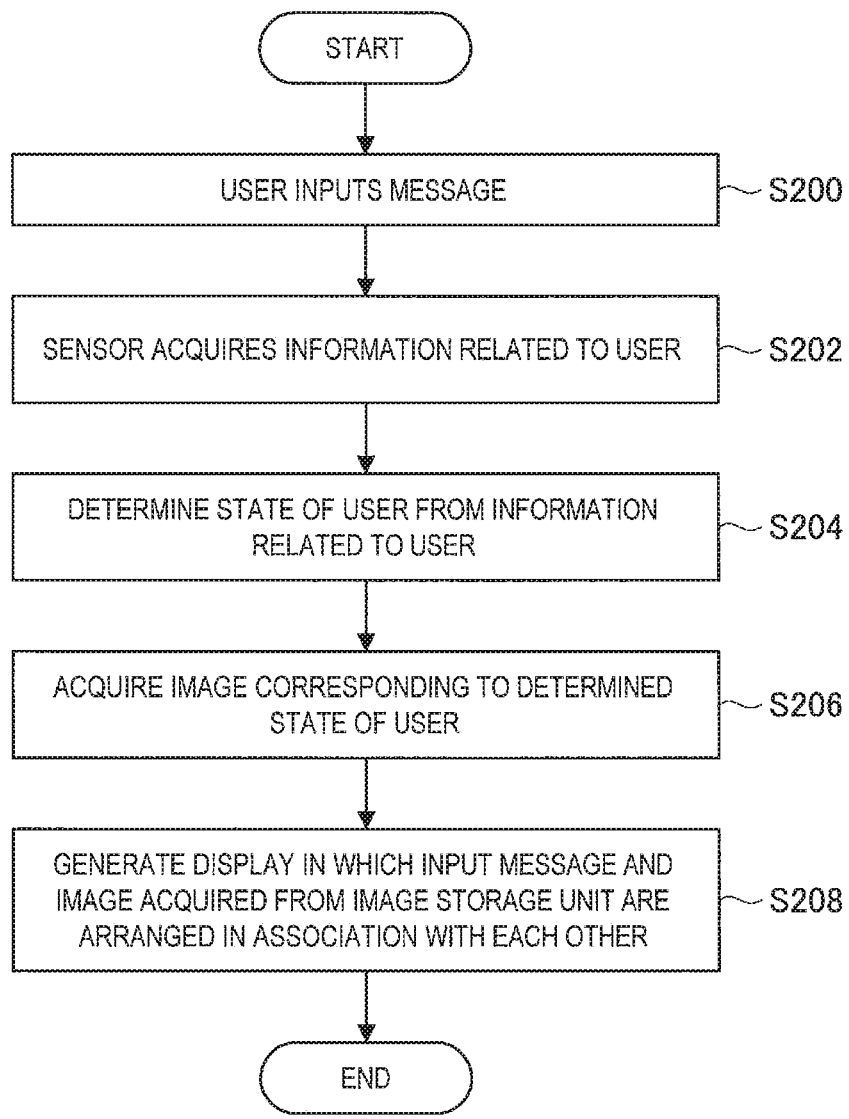

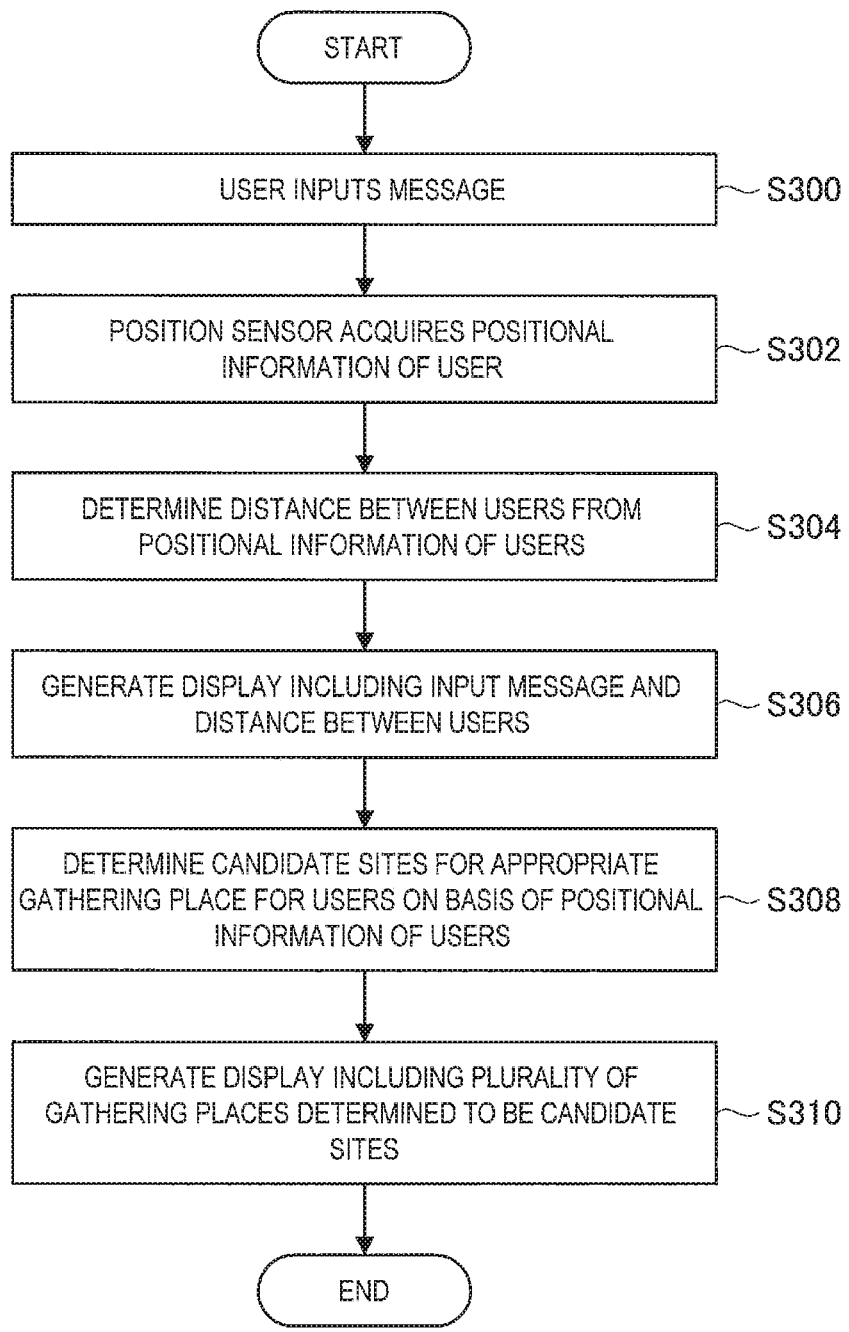

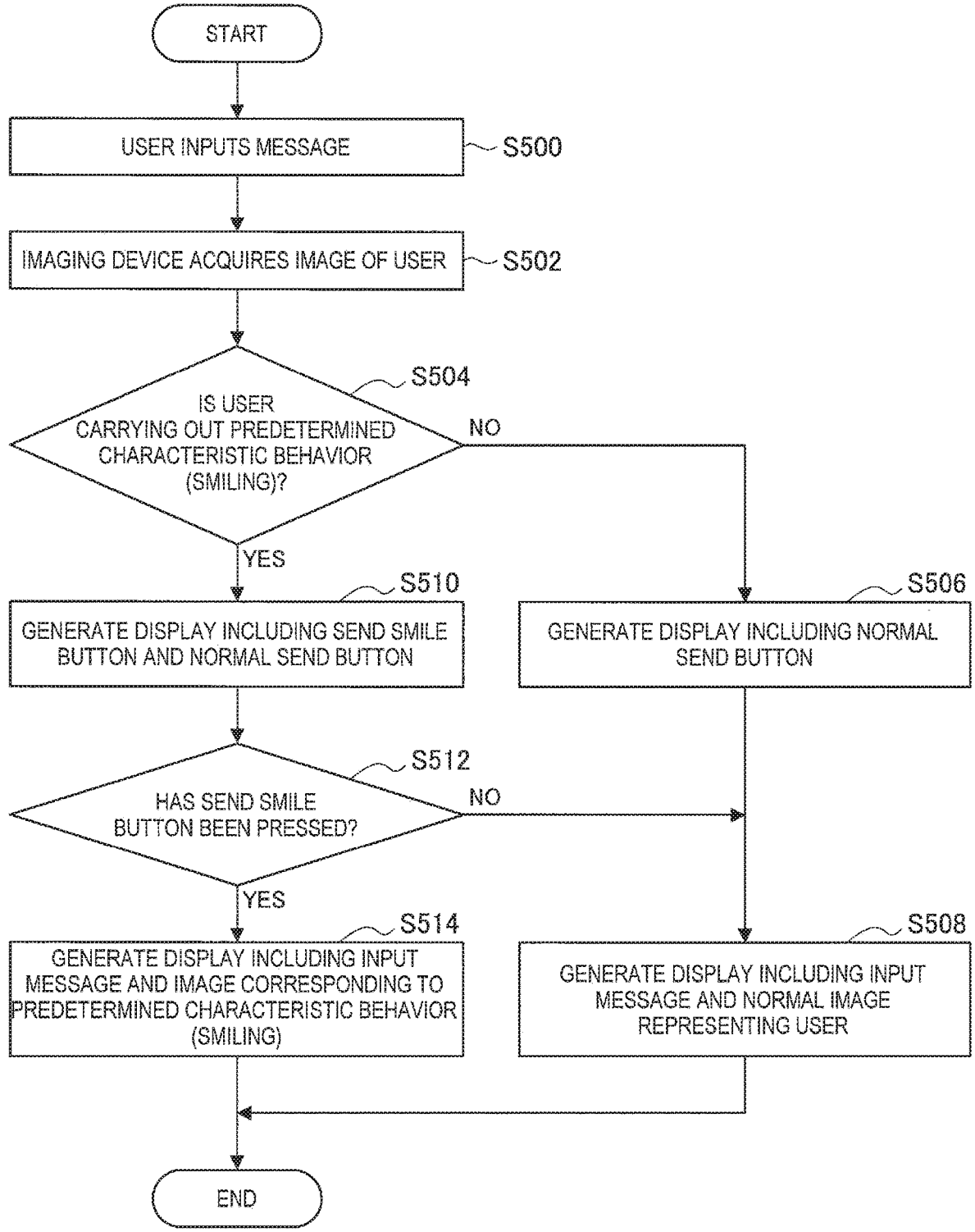

INFORMATION PROCESSING SYSTEM, INFORMATION PROCESSING TERMINAL, AND INFORMATION PROCESSING METHOD

CROSS REFERENCE TO RELATED APPLICATIONS

This application is a U.S. National Phase of International Patent Application No. PCT/JP2015/061759 filed on Apr. 16, 2015, which claims priority benefit of Japanese Patent Application No. JP 2014-136553 filed in the Japan Patent Office on Jul. 2, 2014. Each of the above-referenced applications is hereby incorporated herein by reference in its entirety.

TECHNICAL FIELD

The present disclosure relates to information processing systems, information processing terminals, and information processing methods.

BACKGROUND ART

In recent years, messaging systems such as an e-mail, a short message service (SMS), and online chat have been widely spread as a communication means for two or more users at geographically distant locations.

Users using such a communication means can exchange messages such as a text regardless of time and locations.

Patent Literature 1 discloses a technology for transmitting a state of a user by recognizing behavior of the user from an acceleration sensor, a gyro sensor, and the like, and displaying behavior information indicating the recognized behavior of the user and current positional information of the user.

CITATION LIST

Patent Literature

Patent Literature 1: JP 2009-118513A

DISCLOSURE OF INVENTION

Technical Problem

However, although the technology disclosed in Patent Literature 1 makes it possible for a user to recognize a current position and current behavior of another user, it is difficult to understand transition of states of the another user. In other words, according to the technology disclosed in Patent Literature 1, it is difficult to understand a state of a user at the time of inputting a message from each message in a messaging system to exchange the messages.

Accordingly, the present disclosure proposes a novel and improved information processing system, information processing terminal, and information processing method that are capable of transmit a message with a state of a user by attaching information on the state of the user at the time of inputting the message to the message.

Solution to Problem

According to the present disclosure, there is provided an information processing system including: a message acquisition unit configured to acquire messages input by users; a related information acquisition unit configured to use an imaging device and acquire information related to the user who has input the message; and a control unit configured to control information processing to transmit the input message on the basis of the information related to the user.

According to the present disclosure, there is provided an information processing terminal including: a message acquisition unit configured to acquire a message input by a user; a related information acquisition unit configured to use an imaging device and acquire information related to the user; and a control unit configured to link and send the information related to the user and the input message.

According to the present disclosure, there is provided an information processing method including: acquiring messages input by users; using an imaging device and acquiring information related to the user who has input the message; and controlling information processing to transmit the input message on the basis of the information related to the user.

According to the present disclosure, it is possible to acquire information related to a user who has input a message, and control information processing to transmit the message on the basis of the information related to the user.

Advantageous Effects of Invention

As described above, according to the present disclosure, it is possible to transmit a message with a state of a user at the time of inputting the message, to another user.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 4 is a flowchart illustrating an operation example of an information processing system according to the embodiment.

FIG. 9 is a flowchart illustrating an operation example of an information processing system according to the embodiment.

FIG. 12 is a flowchart illustrating an operation example of an information processing system according to the embodiment.

FIG. 18 is a flowchart illustrating an operation example of an information processing system according to the embodiment.

MODE(S) FOR CARRYING OUT THE INVENTION

Figure 1:
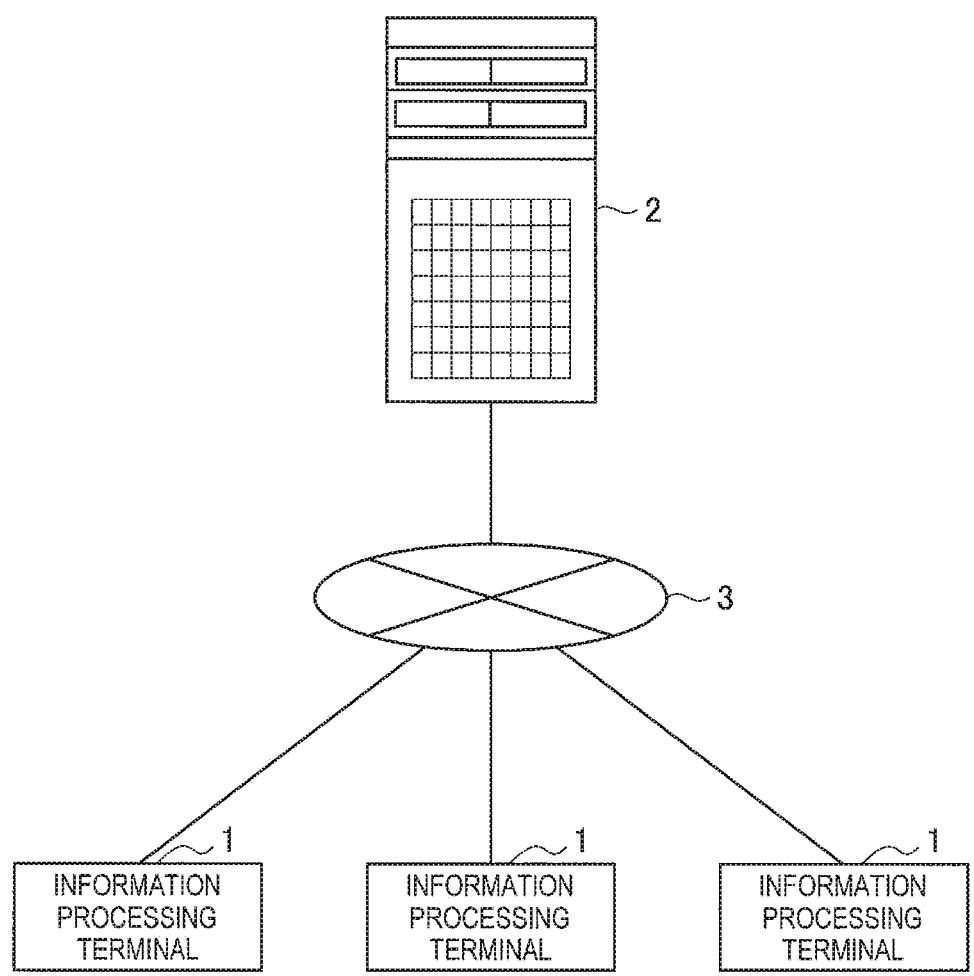
FIG. 1 is an explanatory diagram illustrating an example of a configuration of an information processing system according to the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that the description is given in the following order.
1. Schematic configuration of information processing system according to present disclosure
2. First Embodiment
2.1. Configuration example of information processing system
2.2. Operation example of information processing system
2.3. Modification of operation of information processing system
3. Second Embodiment
3.1. Configuration example of information processing system
2.2. Operation example of information processing system
4. Third Embodiment
4.1. Configuration example of information processing system
4.2. Operation example of information processing system
5. Fourth Embodiment
5.1. Operation example of information processing system
6. Fifth Embodiment
6.1. Configuration example of information processing system
6.2. Operation example of information processing system
7. Hardware Configuration Example <1. Schematic Configuration of Information Processing System According to Present Disclosure>

First, with reference to FIG. 1, a schematic configuration of an information processing system according to the present disclosure is explained. FIG. 1 is an explanatory diagram illustrating an example of a configuration of the information processing system according to the present disclosure.

As illustrated in FIG. 1, the information processing system according to the present disclosure includes an information processing server 2 and a plurality of information processing terminals 1 connected via a network 3. The plurality of the information processing terminals 1 and the information processing server 2 communicate with each other via the network 3.

The information processing system according to the present disclosure is an information processing system that enables two or more users at geographically distant locations to communicate with each other by exchanging text messages, for example. Specifically, the information processing system according to the present disclosure may be a messaging system such as an e-mail, a short message service, an instant messenger, or online chat.

The information processing system according to the present disclosure acquires a message that a user has input to the information processing terminal 1, uses various sensors included in the information processing terminal 1 such as an imaging device, and acquires information related to the user who has input the message. In addition, the information processing system according to the present disclosure controls information processing to transmit the message on the basis of the acquired information related to the user. Thanks to such a configuration, the information processing system according to the present disclosure can transmit a message and a situation of the user at a time of input of the message.

The information processing terminal 1 is an information processing terminal to which a user inputs a message. The information processing terminal 1 includes the various sensors such as the imaging device, and sends the input message and information related to the user to the information processing server 2. The information related to the user is acquired from the various sensors. The information processing terminal 1 may be a portable information processing terminal such as a mobile phone, a smartphone, or a tablet terminal. In the present disclosure, the number of the information processing terminals 1 connected to the network 3 is not specifically limited as long as the number of the information processing terminals 1 connected to the network 3 is two or more.

The information processing server 2 receives the information related to the user from the information processing terminal 1, and controls information processing to transmit the message input to the information processing terminal 1 on the basis of the information related to the user. Specifically, the information processing server 2 acquires the message input to the information processing terminal 1 and information related to the user who has input the message, generates display for transmitting the message on the basis of the information related to the user, and sends the display to each of the information processing terminals 1. Here, details of the information processing performed by the information processing server 2 will be described in a first embodiment to a fifth embodiment as follows. A part or all of the information processing that is performed by the information processing server 2 may be performed by each of the information processing terminals 1.

The network 3 is a communication network that enables communication between the information processing terminals 1 and the information processing server 2. The network 3 may be a public network, a local area network (LAN), a wide area network (WAN), or the like, the public network including the Internet, a satellite communication network, a telephone network, and the like, for example.

Hereinafter, details of the configuration of the information processing system according to the present disclosure will be described in the first to fifth embodiments.

<2. First Embodiment>

First, with reference to FIG. 2 to FIG. 6, an information processing system according to a first embodiment of the present disclosure is described. The information processing system according to the first embodiment of the present disclosure includes an information processing terminal 1A provided with the imaging device, and generates display in which an input message and an image captured by the imaging device are arranged in association with each other. Thereby, the information processing system according to the first embodiment of the present disclosure can transmit the message and a situation of a user at the time of input of the message.

Specifically, the information processing system captures the image by the imaging device, and acquires the image on the basis of predetermined input operation at the time when the user has input and sent the message. The information processing system generates the display in which the input message and the image captured by the imaging device are arranged in association with each other, and sends the display to the information processing terminal 1A. By using the information processing system, the user who sends the message can transmit the message and a surrounding situation at the time of input of the message as the captured image.

The image captured by the imaging device may be subjected to a blurring process to reduce visibility to the extent that surrounding ambience at the time of input of the message can be understood, in view of privacy of people in the captured image. In the case where the imaging device is provided at the same surface as a display unit in the information processing terminal 1, images captured by the imaging device may include an image of the face of a user. On the other hand, in the case where the imaging device is provided at a different surface from the display unit in the information processing terminal 1, images captured by the imaging device do not have to include an image of the face of the user.

[2.1. Configuration Example of Information Processing System]

Figure 2:
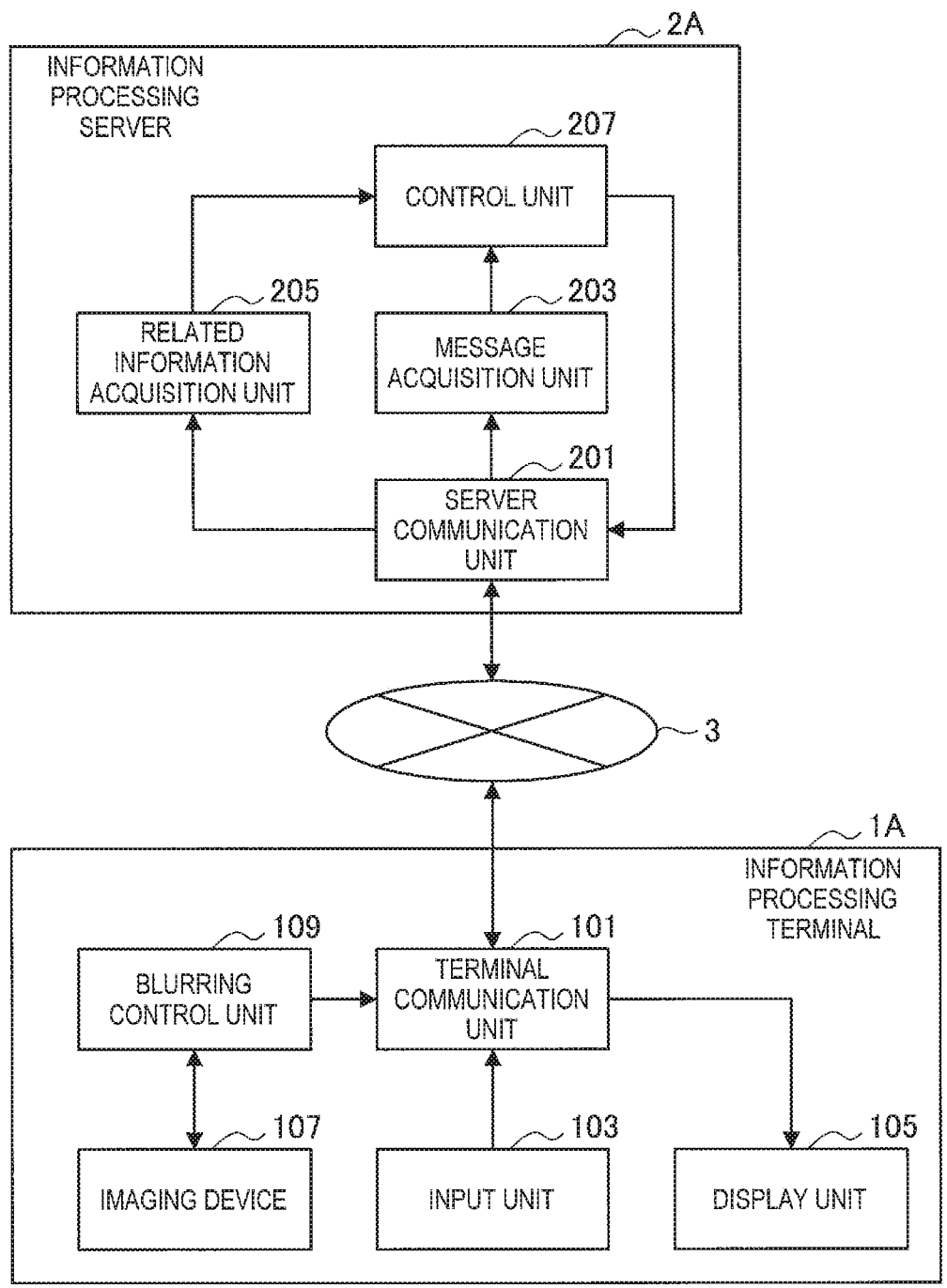
FIG. 2 is a block diagram illustrating an internal configuration of an information processing system according to a first embodiment of the present disclosure.

First, with reference to FIG. 2, details of the configuration of an information processing system according to the first embodiment of the present disclosure will be described. FIG. 2 is a block diagram illustrating an internal configuration of the information processing system according to the first embodiment of the present disclosure.

As illustrated in FIG. 2, the information processing system according to the first embodiment of the present disclosure includes the information processing terminal 1A and an information processing server 2A. The information processing terminal 1A and the information processing server 2A are connected via the network 3.

The information processing terminal 1A includes a terminal communication unit 101, an input unit 103, a display unit 105, an imaging device 107, and a blurring control unit 109. The information processing server 2A includes a server communication unit 201, a message acquisition unit 203, a related information acquisition unit 205, and a control unit 207. The configuration of the network 3 is substantially similar to FIG. 1. Accordingly, repeated description is omitted here.

(Configuration of Information Processing Terminal)

The terminal communication unit 101 communicates with the information processing server 2A. Specifically, the terminal communication unit 101 receives display generated by the control unit 207 from the information processing server 2A, and sends a message input to the input unit 103 and an image captured by the imaging device 107 to the information processing server 2A. For example, the terminal communication unit 101 may be a communication interface including a communication device and the like to connect to the network 3. The terminal communication unit 101 may be a communication device capable of connecting to a telephone network in a wired/wireless manner, may be a wired/wireless LAN compatible communication device, or may be a wired communication device that performs communication in a wired manner.

The input unit 103 is an input device by which a user can input a message. Specifically, the input unit 103 includes: an input mechanism used by the user for imputing textual information, such as a keyboard, a button, and a microphone; an input control circuit configured to generate an input signal based on the user input; and the like. Alternatively, the input unit 103 may be an input device capable of inputting textual information by using a virtual keyboard, or the like.

The display unit 105 is a display device that displays an image generated by the information processing terminal 1A or the information processing server 2A. For example, the display unit 105 may be a liquid crystal display (LCD) device, an organic light emitting diode (OLED) device, or the like.

The imaging device 107 includes an imaging lens, an image sensor, and the like to capture an image of a subject. Specifically, the imaging device 107 uses the image sensor including a complementary metal-oxide-semiconductor (CMOS) image sensor, a charge-coupled device (CCD) image sensor, or the like, to perform photoelectric conversion on incident light from the subject via the imaging lens and change the light into an image signal. The imaging device 107 may be provided at the same surface as the display unit 105 in the information processing terminal 1A, or the imaging device 107 may be provided at a different surface from the display unit 105. Alternatively, the imaging device 107 may be provided at a different information processing terminal (for example, wearable terminal such as glasses-type terminal) from the information processing terminal 1A, and execute a function of the information processing system according to the present disclosure by communicating with the information processing terminal 1A.

In the case where the blurring process (to be described later) is performed by using a defocusing process, it is preferable that the imaging device 107 be an imaging device that detects a point of focus by using an image surface phase difference detection method. According to the image surface phase difference detection method, light incident from the imaging lens is divided into two beams of light and guided to a dedicated sensor to determine directions and shift length of the points of focus from a just focus on the basis of an interval between two formed images. A feature of the image surface phase difference detection method is that the dedicated sensor to which the incident light is guided is on the same surface (image surface) as the image sensor. By using such an image surface phase difference detection method, it is possible to detect directions and shift length of the points of focus from a just focus with respect to a subject. Therefore, the imaging device 107 can acquire an image subjected to the defocusing process with an appropriate amount of blurring by appropriately controlling the shift length of the point of focus from the just focus. In addition, by using the image surface phase difference detection method, it is possible to detect a point of focus more quickly than other focus detection methods (for example, contrast detection method). Therefore, the imaging device 107 can capture an image with a high instantaneousness.

The imaging device 107 may automatically capture an image and acquire the image when the user inputs a message and an instruction to send the message is issued. According to such a configuration, the information processing terminal 1A can automatically acquire the image captured by the imaging device 107 without requesting the user to perform special operation.

Alternatively, the imaging device 107 may automatically capture an image and acquire the image when the user inputs a predetermined character string. According to such a configuration, the information processing terminal 1A enable a user to instruct the imaging device 107 to capture an image while inputting a message. It is preferable that the predetermined character string used by the user to issue the image capturing instruction be a character string that is hardly used in a usual message. For example, an example of the predetermined character string includes "##", "@@@", and the like. In addition, it is preferable that the predetermined character string used for the image capturing instruction be automatically deleted from a message input box after the image capturing is finished.

Alternatively, the imaging device 107 may capture an image and acquire the image when the user issues the image capturing instruction. According to such a configuration, the information processing terminal 1A enables a user to capture an image at a desired timing.

The blurring control unit 109 controls a blurring process to be performed on an image captured by the imaging device 107. Specifically, the blurring control unit 109 performs image processing on the image captured by the imaging device 107 to reduce visibility, in order to protect privacy of people in the captured image. For example, the blurring control unit 109 may generate an image with low visibility by performing a resolution reducing process, a contract reducing process, or a binarization process on the image captured by the imaging device 107. The blurring process that the blurring control unit 109 performs on the image captured by the imaging device 107 is not limited to the above described example and various known image processing can be used, as long as the blurring process is the image processing to reduce visibility of the image.

The blurring control unit 109 may performs a blurring process on the captured image by causing the imaging device 107 to capture the image in a defocus state. Specifically, the blurring control unit 109 adjusts a point of focus in a manner that shift length (defocus amount) of the point of focus from a just focus becomes a predetermined length (amount) by using the image surface phase difference detection method of the imaging device 107. Subsequently, the blurring control unit 109 causes the imaging device 107 to capture an image at the defocus state. According to such a configuration, the blurring control unit 109 does not have to perform the image processing on the captured image. Therefore, it is possible to reduce power consumption.

A preferable degree of the blurring process performed by the blurring control unit 109 is the extent that the captured image is not too blurred or too clear, and only ambience of a situation of a user can be understood. Alternatively, a degree of the blurring process performed by the blurring control unit 109 may be a blurring amount set by the user.

In the blurring process using the defocusing process, visibility of an image rapidly decreases when the defocus amount increases. Therefore, in the case where the defocus amount is too large, it may be possible that no image is obtained in an image obtained by the imaging device 107. Accordingly, it is preferable that the imaging device 107 have a point-of-focus detection function using the image surface phase difference detection method that is capable of detecting shift length and a direction of a point of focus from a just focus and precisely adjusting the point of focus, to precisely adjust the point of focus. Of course, the defocus amount of the imaging device 107 adjusted by the blurring control unit 109 may be a defocus amount corresponding to a defocus amount set by a user.

(Configuration of Information Processing Server)

The server communication unit 201 communicates with the information processing terminal 1A. Specifically, the server communication unit 201 receives the message input to the input unit 103 and the image captured by the imaging device 107 from the information processing terminal 1A, and sends the display generated by the control unit 207 to the information processing terminal 1A. For example, the server communication unit 201 may be a communication interface including a communication device and the like to connect to the network 3. The server communication unit 201 may be a communication device capable of connecting to a telephone network in a wired/wireless manner, may be a wired/wireless LAN compatible communication device, or may be a wired communication device that performs communication in a wired manner.

The message acquisition unit 203 acquires a message input to each information processing terminal 1A. Specifically, the message acquisition unit 203 acquires a message input to each information processing terminal 1A, via the network 3.

The related information acquisition unit 205 acquires information related to a user acquired in each information processing terminal 1A. Specifically, the related information acquisition unit 205 acquires an image captured when a message is input from each information processing terminal 1A. In other words, in the first embodiment of the present disclosure, the information related to the user means an image captured by the imaging device 107.

The control unit 207 controls information processing to transmit the acquired message on the basis of the information related to the user acquired by the related information acquisition unit 205. Specifically, the control unit 207 generates display in which the captured image acquired by the related information acquisition unit 205 and the message acquired by the message acquisition unit 230 are arranged in association with each other. More specifically, the control unit 207 generates display in which the captured image acquired by the related information acquisition unit 205 is used as a background of the message acquired by the message acquisition unit 203.

In the case of generating the display in which the captured image is used as the background of the message, the control unit 207 may change a display color of the message on the basis of color information of the captured image acquired by the related information acquisition unit 205. For example, sometimes it is difficult to visually recognize the message in the case where there is little difference between brightness of the display color of the message and brightness of colors of the image used as the background, and contrast of a font color of the message is lower than the background. In such a case, the control unit 207 may calculate average brightness of colors in the entire captured image or in an area in which the message is displayed, and change the font color of the message to be displayed in a manner that difference between the calculated average brightness and the brightness of the font color of the message to be displayed increases.

[2.2. Operation Example of Information Processing System]

Figure 3A:
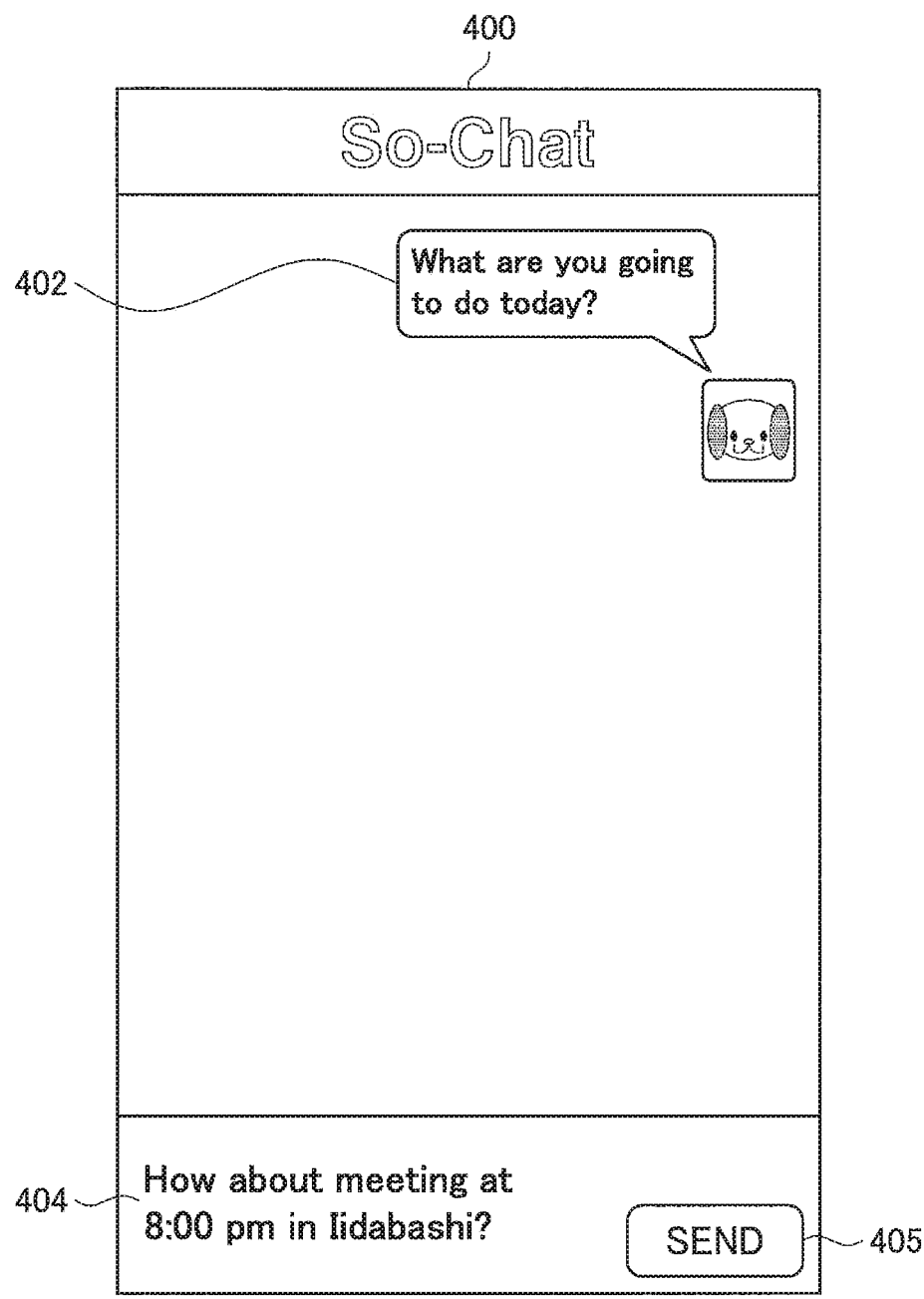
FIG. 3A is an explanatory diagram illustrating an example of display generated by a control unit according to the embodiment.
Figure 3B:
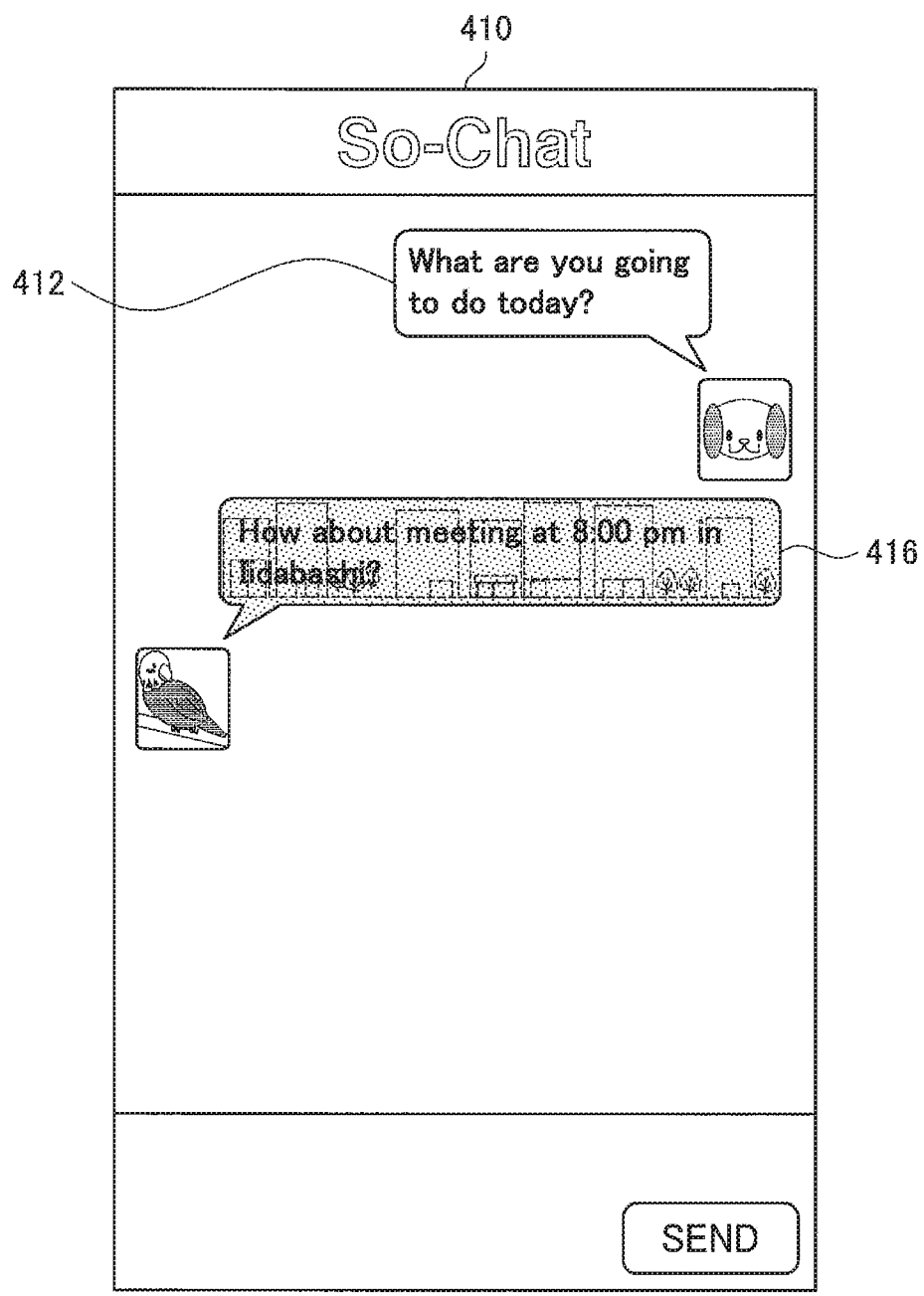
FIG. 3B is an explanatory diagram illustrating an example of display generated by a control unit according to the embodiment.
Figure 5:
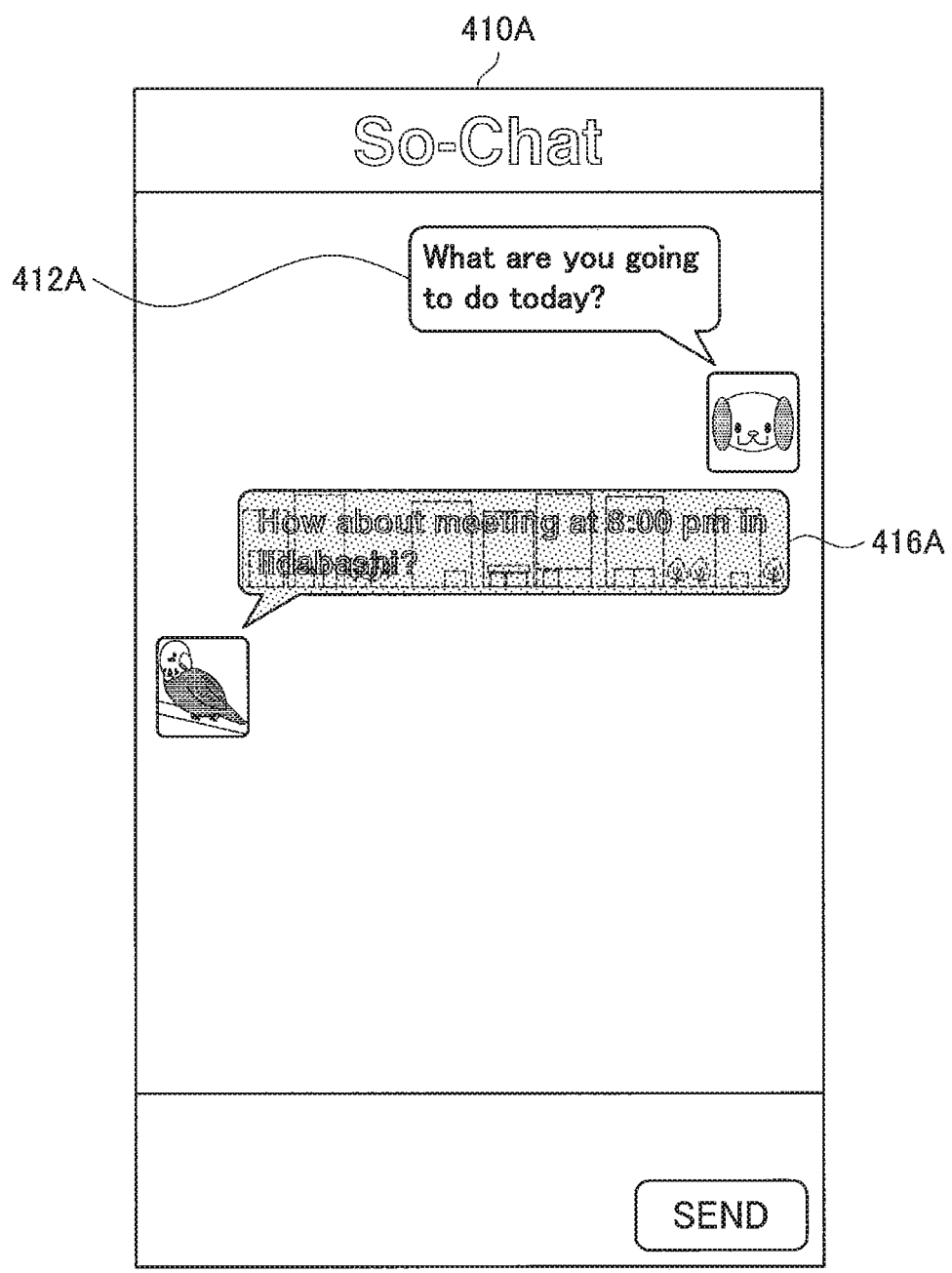
FIG. 5 is an explanatory diagram illustrating a modification of the display in FIG. 3B.

Next, with reference to FIG. 3A to FIG. 5, an operation example of the information processing system according to the first embodiment of the present disclosure will be described. FIG. 3A and FIG. 3B is each an explanatory diagram illustrating an example of display generated by the control unit 207. FIG. 4 is a flowchart illustrating an operation example of the information processing system according to the first embodiment of the present disclosure. FIG. 5 is an explanatory diagram illustrating a modification of the display in FIG. 3B.

Hereinafter, operation of the information processing system will be described in line with the flowchart in FIG. 4, with reference to display generated by the control unit 207 in FIG. 3A and FIG. 3B.

Display 400 in FIG. 3A displays a message 402 "What are you going to do today?" that has been sent by a first user. In response to the message 402, a second user inputs a message "How about meeting at 8:00 pm in Iidabashi?" in a message input box 404 (S100). Subsequently, the imaging device 107 captures an image in the case where the second user presses a send button 405 (S102). Next, the blurring control unit 109 performs the blurring process on the image captured by the imaging device 107 (S104).

Subsequently, the control unit 207 generates display in which the input message and the image subjected to the blurring process are arranged in association with each other (S104). Specifically, the control unit 207 generates display 410 illustrated in FIG. 3B. In the display 410 illustrated in FIG. 3B, a message 416 "How about meeting at 8:00 pm in Iidabashi?" input by the second user is displayed below a message 412 "What are you going to do today?" input by the first user. In addition, the background of the message 416 input by the second user is the image that has been captured by the imaging device 107 and that has been subjected to the blurring process.

In Step S102, the timing when the imaging device 107 captures an image is not limited to the above example. The timing may be timing when a button for ordering image capturing is pressed or when a predetermined character string is input.

Therefore, the information processing system according to the first embodiment of the present disclosure can display an image captured when a message is input, in association with the input message. Thereby, the information processing system according to the first embodiment of the present disclosure can transmit the message and a situation of a user at the time of input of the message by using the captured image.

Alternatively, the control unit 207 may generate display 410A illustrated in FIG. 5. In the display 410A illustrated in FIG. 4, a message 416A "How about meeting at 8:00 pm in Iidabashi?" is displayed below a message 412A "What are you going to do today?" The font color of the message 416A is changed on the basis of color information of the image used as the background. For example, the color information of the image used as the background is average brightness of colors of the entire image used as the background. The control unit 207 can improve visibility of the message 416A by controlling the font color of the message 416A in a manner that difference between the font color of the message 416A and the average brightness of the colors of the entire image is increased.

[2.3. Modification of Operation of Information Processing System]

Figure 6:
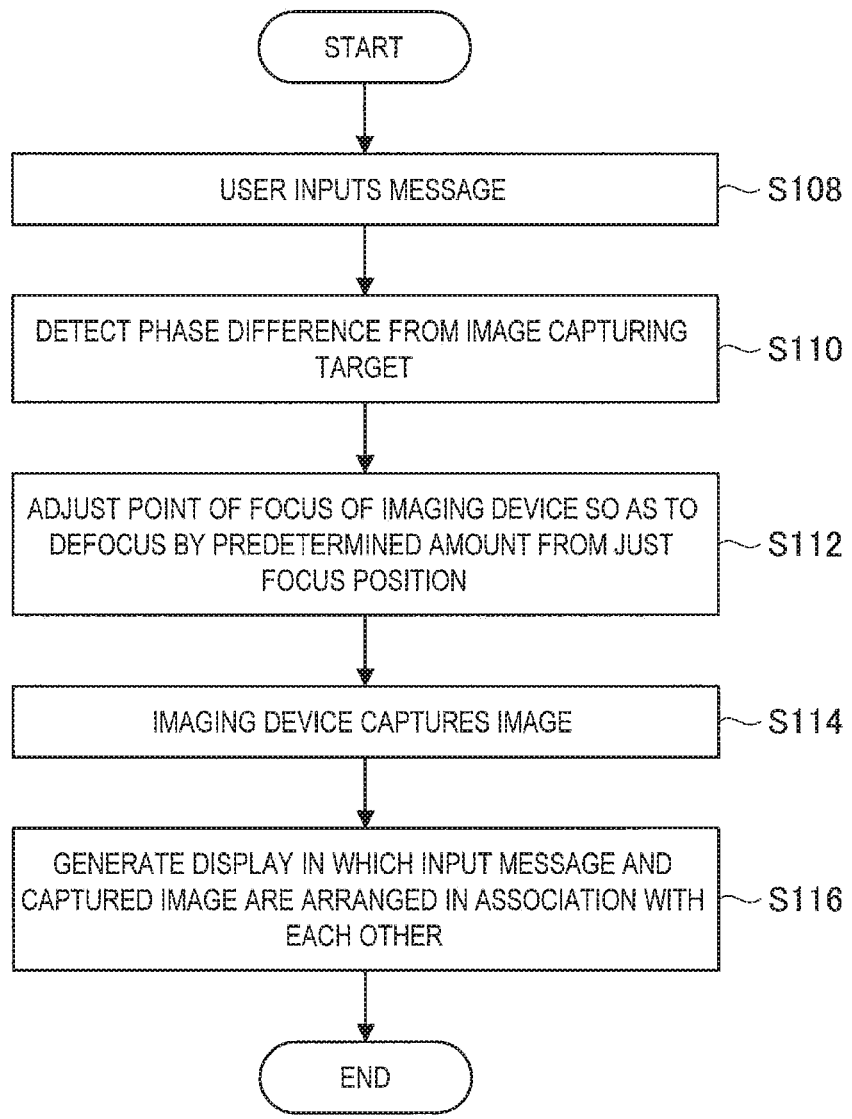
FIG. 6 is a flowchart illustrating a modification of operation of an information processing system according to the embodiment.

With reference to FIG. 6, a modification of the operation of the information processing system according to the first embodiment of the present disclosure will be described. FIG. 6 is a flowchart illustrating the modification of the operation of the information processing system according to the first embodiment of the present disclosure. This modification is an operation example of the information processing system in the case where the imaging device 107 in the information processing terminal 1A detects a point of focus by using the image surface phase difference detection method, and the blurring control unit 109 performs the blurring process on a captured image by using the defocusing process.

As illustrated in FIG. 6, first, the second user inputs a message (S108). Next, in the case where the second user press the send button 405, the imaging device 107 detects phase difference from an image capturing target by using the image surface phase difference detection method, and detects a point of focus (S110). Subsequently, the blurring control unit 109 adjusts the point of focus of the imaging device 107 so as to defocus by a predetermined amount from a just focus position (S112). Subsequently, the imaging device 107 captures an image in a defocus state (S114). Next, the control unit 207 generates display in which the input message and the image subjected to the blurring process by the defocusing process are arranged in association with each other (S116).

According to the modification of the operation of the information processing system according to the first embodiment of the present disclosure, it is possible to add blurring effect to an image captured by the imaging device 107 without performing any image processing. Therefore, the information processing system according to the first embodiment of the present disclosure can reduce power consumed in image processing.

As described above, the information processing system according to the first embodiment of the present disclosure can generate display in which an input message and an image captured by the imaging device 107 when a user inputs the message are arranged in association with each other. Therefore, the user who has input the message can transmit the message and a surrounding situation at the time of input of the message by using the captured image.

<3. Second Embodiment>

Next, with reference to FIG. 7 to FIG. 9, an information processing system according to a second embodiment of the present disclosure will be described. The information processing system according to the second embodiment of the present disclosure includes an information processing terminal 1B having various sensors, and generates display in which an input message and an image based on information that is related to a user and that has been obtained from the various sensors are arranged in association with each other. Thereby, the information processing system according to the second embodiment of the present disclosure can transmit the message and a situation of a user at the time of input of the message.

Specifically, the information processing system acquires information related to a user by using the various sensors on the basis of predetermined input operation at the time when the user has input and sent the message. In addition, the information processing system determines a state of the user from the acquired information related to the user, and acquires an image corresponding to the state of the user. Moreover, the information processing system generates display in which the input message and the image corresponding to the state of the user are arranged in association with each other, and sends the display to the information processing terminal 1B. By using the information processing system, the user who sends the message can transmit the message and a state of the user at the time of input of the message in various forms.

[3.1. Configuration Example of Information Processing System]

First, with reference to FIG. 7, details of the configuration of the information processing system according to the second embodiment of the present disclosure will be described. FIG. 7 is a block diagram illustrating an internal configuration of the information processing system according to the second embodiment of the present disclosure.

Figure 7:
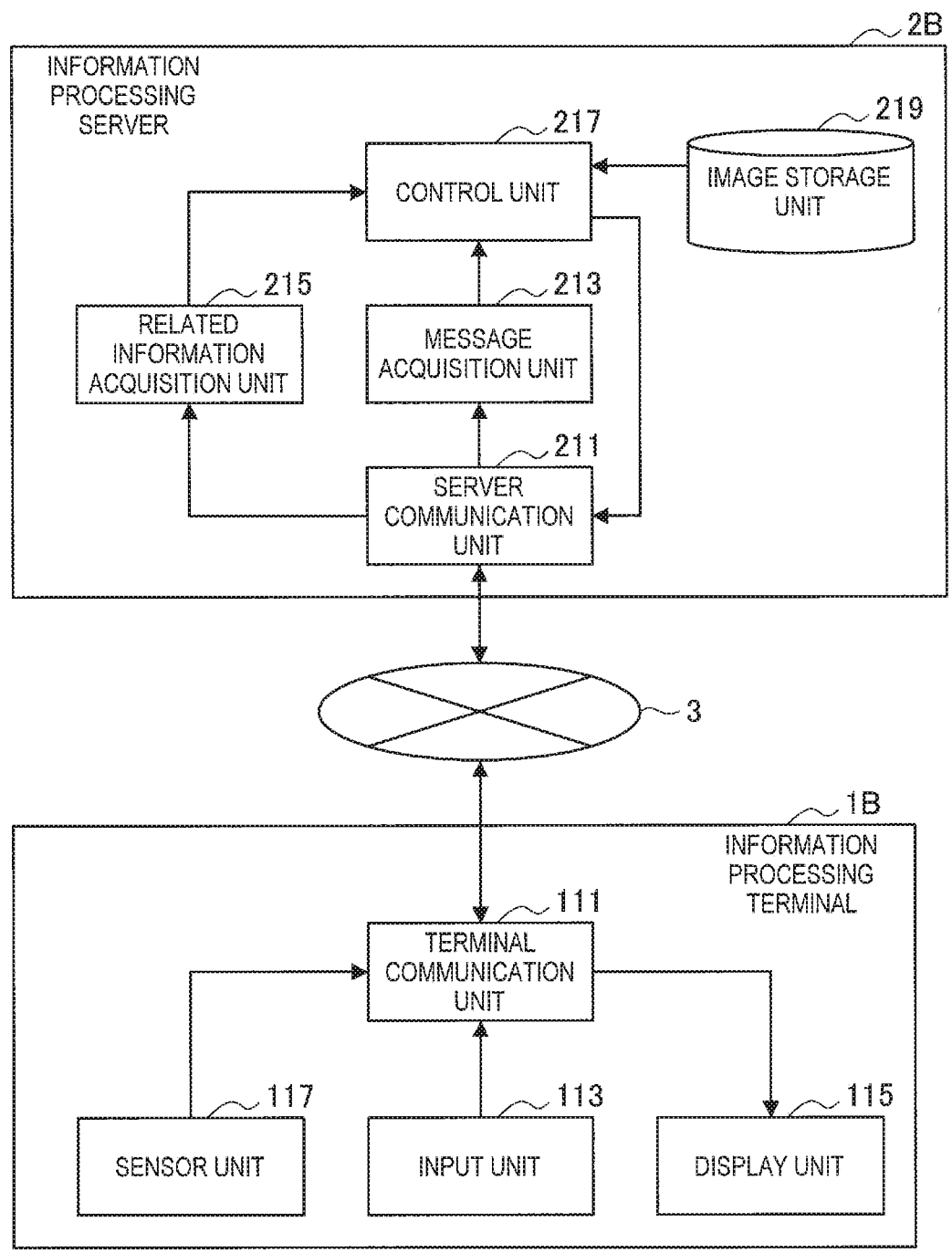
FIG. 7 is a block diagram illustrating an internal configuration of an information processing system according to a second embodiment of the present disclosure.

As illustrated in FIG. 7, the information processing system according to the second embodiment of the present disclosure includes the information processing terminal 1B and an information processing server 2B. The information processing terminal 1B and the information processing server 2B are connected via the network 3. The configuration of the network 3 is substantially similar to FIG. 1. Accordingly, repeated description is omitted here.

The information processing terminal 1B includes a terminal communication unit 111, an input unit 113, a display unit 115, and a sensor unit 117. The information processing server 2B includes a server communication unit 211, a message acquisition unit 213, a related information acquisition unit 215, a control unit 217, and an image storage unit 219

(Configuration of Information Processing Terminal)

The terminal communication unit 111, the input unit 113, and the display unit 115 are similar to the terminal communication unit 101, the input unit 103, and the display unit 105 that have been described in the first embodiment. Therefore, repeated description is omitted here.

The sensor unit 117 includes various sensors, and acquires information related to a user. For example, the sensor unit 117 may be a sensor that acquires positional information of a user such as a Global Positioning System (GPS) sensor, or may be a sensor that acquires information related to an environment around the user such as an illuminance sensor, a temperature sensor, or a proximity sensor. In addition, the various sensors may be a sensor that acquires information related to the body of the user such as a heart rate sensor or a blood pressure sensor. Moreover, the sensor unit 117 may include an imaging device.

Specifically, the sensor unit 117 may include the GPS sensor, and acquire positional sensor of a user by using the GPS sensor. The sensor unit 117 may include a sensor that acquires positional information of a base station or an access point that has been used for communication with the network 3, and may acquire positional information of a user by using such a sensor.

For example, the sensor unit 117 may include the illuminance sensor and acquire illuminance information of an environment of the user by using the illuminance sensor. The sensor unit 117 may include the temperature sensor and acquire temperature information of the environment of the user by using the temperature sensor. The sensor unit 117 may include a depth sensor, the proximity sensor, and the like, and acquire information related to structures around the user by using the sensors. According to such a configuration, the control unit 217 (to be described later) can determine a detailed environment of the user which cannot be determined by the positional information, by referring to the illuminance information and the temperature information of the environment of the user, and the information related to the structures around the user. An example of the detailed environment includes information on whether a place where the user is present is an indoor place, an outdoor place, underground, or a place above the ground.

In addition, for example, the sensor unit 117 may include the heart rate sensor or the blood pressure sensor, and acquire the information related to the body of the user by using such a sensor. According to such a configuration, the control unit 217 (to be described later) can determine an activity situation of a user by referring to the information related to the body of the user. An example of the activity situation includes information on whether or not the user is exercising, running, sitting, or the like.

The sensor unit 117 is not limited to the various sensors described above. The sensor unit 117 may include various known sensor, and acquire various information by using the various known sensor included in the sensor unit 117. The sensor unit 117 may be provided at a different information processing terminal (for example, wearable terminal such as glasses-type terminal) from the information processing terminal 1B, and execute a function of the information processing system according to the present disclosure by communicating with the information processing terminal 1B.

A timing when the sensor unit 117 acquires information related to a user may be similar to the timing when the imaging device 107 acquires an image in the first embodiment. Specifically, the sensor unit 117 may acquire the information when the user orders transmission of an input message, or may acquire the information when the user inputs a predetermined character string. Alternatively, the sensor unit 117 may acquire the information when the user orders acquisition of the information.

(Configuration of Information Processing Server)

The server communication unit 211 and the message acquisition unit 213 are similar to the server communication unit 201 and the message acquisition unit 203 that have been described in the first embodiment. Therefore, repeated description is omitted here.

The related information acquisition unit 215 acquires information related to a user acquired in each information processing terminal 1B. Specifically, the related information acquisition unit 215 acquires various types of information related to a user acquired by the sensor unit 117 when a message is input to each information processing terminal 1B. In other words, in the second embodiment of the present disclosure, the information related to the user means the various types of information related to the user acquired by the sensor unit 117.

The control unit 217 controls information processing to transmit the acquired message on the basis of the information related to the user acquired by the related information acquisition unit 215. Specifically, the control unit 217 determines a state of a user on the basis of information related to the user acquired by the related information acquisition unit 215, and generates display in which an image corresponding to the state of the user and a message acquired by the message acquisition unit 213 are arranged in association with each other. More specifically, the control unit 217 generates display in which the image corresponding to the state of the user is used as a background of the message acquired by the message acquisition unit 213.

For example, the control unit 217 may determine a place where a user is present from acquired positional information of the user, and generate display in which a message and an image corresponding to the place where the user is present are arranged in association with each other. Alternatively, the control unit 217 may calculate an average movement speed of a user from change in positional information of the user in a predetermined time period, and generate display in which a message and an image representing a speed corresponding to the movement speed of the user are arranged in association with each other. Alternatively, the control unit 217 may determine a place where a user is present from the illuminance information and the temperature information of the environment of the user, and the information related to the structures around the user (in other words, information related to the environment around the user), and generate display in which a message and an image corresponding to the place where the user is present are arranged in association with each other. Alternatively, the control unit 217 may determine an activity situation of a user from information related to the body of the user, and generate display in which a message and an image corresponding to the activity situation of the user (for example, exercising, sitting, or the like) are arranged in association with each other.

Alternatively, the control unit 217 may determine a position where a user is present and an activity situation of the user further on the basis of a word included in a message acquired by the message acquisition unit 213. For example, in the case where a message acquired by the message acquisition unit 213 includes a noun representing a building such as a "library" or a proper noun representing a name of a place such as "Iidabashi", the control unit 217 may determine that a place indicated by such a noun is a position where the user is present.

In addition, in the case where a message acquired by the message acquisition unit 213 includes a word corresponding to a determined state of a user, the control unit 217 may generate display in which the word corresponding to the state of the user is emphasized. For example, in the case where the control unit 217 determines that a place where the user is present is the "library" from positional information and a message acquired by the message acquisition unit 213 includes a word "library", the control unit 217 may generate display in which the word "library" is emphasized.

In the case where the control unit 217 generates display in which an image corresponding to a state of a user is used as a background of a message in a way similar to the first embodiment, a font color of the message to be displayed may be changed on the basis of color information of the image corresponding to the state of the user.

The image storage unit 219 stores images corresponding to states of a user that are to be arranged in association with the control unit 217 messages. In the example illustrated in FIG. 7, the image storage unit 219 is included in the information processing server 2B. However, the technology of the present disclosure is not limited thereto. For example, the image storage unit 219 may be included in another information processing device connected to the network 3. Alternatively, the control unit 217 may acquire an image corresponding to a state of a user by searching every storage device connected to the network 3.

[3.2. Operation Example of Information Processing System]

Figure 8A:
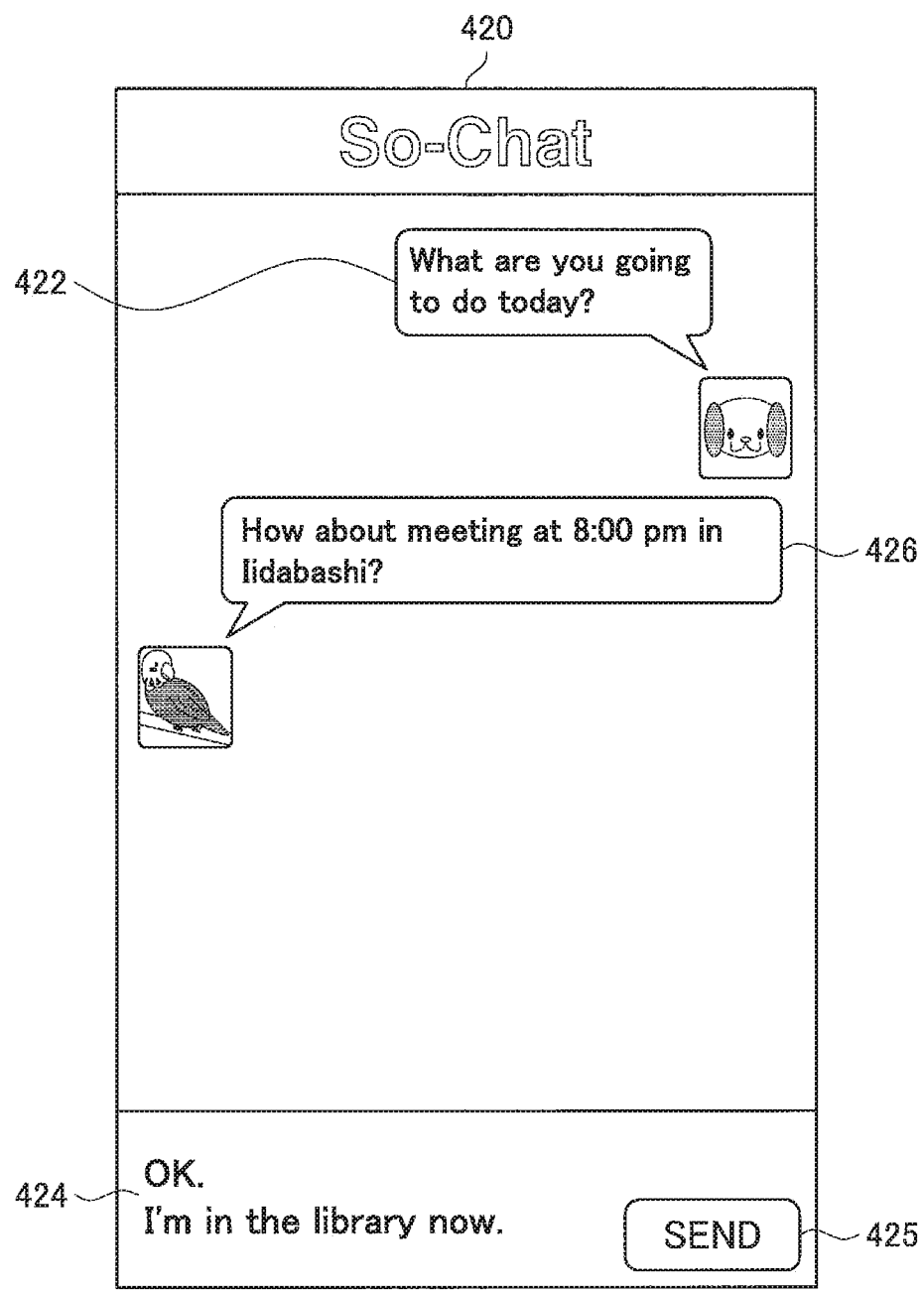
FIG. 8A is an explanatory diagram illustrating an example of display generated by a control unit according to the embodiment.
Figure 8B:
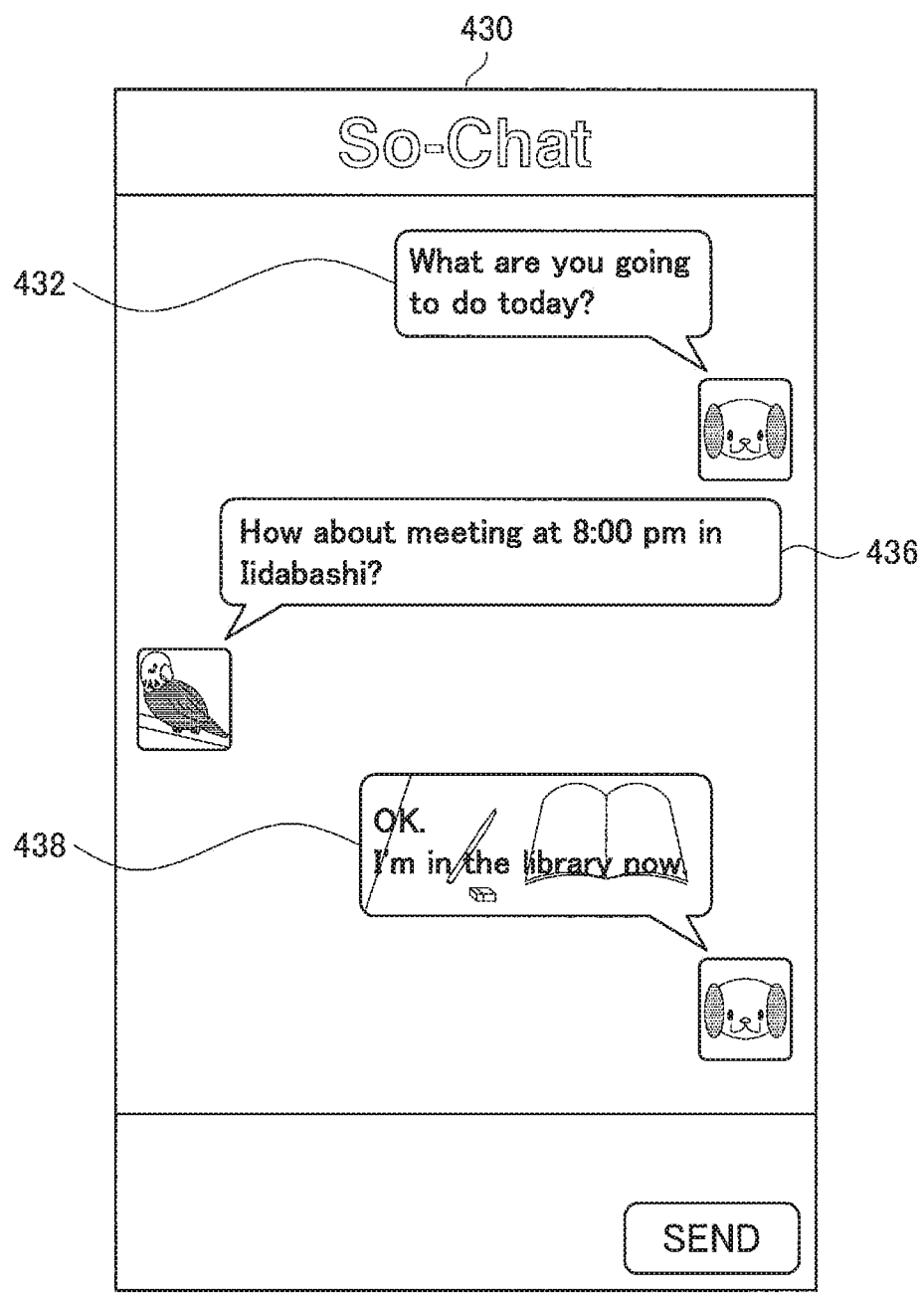
FIG. 8B is an explanatory diagram illustrating an example of display generated by a control unit according to the embodiment.

Next, with reference to FIG. 8A to FIG. 9, an operation example of the information processing system according to the second embodiment of the present disclosure will be described. FIG. 8A and FIG. 8B is each an explanatory diagram illustrating an example of display generated by the control unit 217. FIG. 9 is a flowchart illustrating an operation example of the information processing system according to the second embodiment of the present disclosure.

Hereinafter, operation of the information processing system will be described in line with the flowchart in FIG. 9, with reference to display generated by the control unit 217 in FIG. 8A and FIG. 8B.

Display 420 in FIG. 8A displays a message 422 "What are you going to do today?" that has been sent by the first user, and displays a message 426 "How about meeting at 8:00 pm in Iidabashi?" that has been sent by the second user. In response to the message 426, the first user inputs a message "OK. I'm in the library now." in a message input box 424 (S200). Subsequently, the sensor unit 117 acquires information related to the user in the case where the first user presses a send button 425 (S202). Next, the control unit 217 determines a state of the user from the information related to the user (S204), and acquires an image corresponding to the determined state of the user from the image storage unit 219 (S206).

Subsequently, the control unit 217 generates display in which the input message and the acquired image corresponding to the state of the user are arranged in association with each other (S208). Specifically, the control unit 217 generates display 430 illustrated in FIG. 8B. In the display 430 illustrated in FIG. 3B, a message 438 "OK. I'm in the library now." input by the first user is displayed below the message 426 "How about meeting at 8:00 pm in Iidabashi?" input by the second user. In addition, an image of a library corresponding to the place where the first user is present is used as a background of the message 438 "OK. I'm in the library now." input by the first user. The control unit 217 may change display of the characters in a manner that the word "library" is emphasized in the message 438 "OK. I'm in the library now."

In Step S202, the timing when the sensor unit 117 acquires information related to a user is not limited to the above example in a way similar to the first embodiment. The timing may be timing when a button for ordering information acquisition is pressed or when a predetermined character string is input.

As described above, the information processing system according to the second embodiment of the present disclosure can display an image corresponding to a state of a user determined from information acquired when a message is input, in association with the input message. Thereby, the information processing system according to the second embodiment of the present disclosure can transmit a message and a situation of a user at the time of input of the message by using an image corresponding to a state of the user.

<4. Third Embodiment>

Next, with reference to FIG. 10 to FIG. 12, an information processing system according to a third embodiment of the present disclosure will be described. The information processing system according to the third embodiment of the present disclosure includes an information processing terminal 1C having a position sensor, and generates display in which an input message and distance between users are arranged in association with each other. The distance between the users is determined on the basis of positional information of the users acquired by the positional sensors. Thereby, the information processing system according to the third embodiment of the present disclosure can transmit the message and the distance between the users at the time of input of the message.

Specifically, the information processing system acquires positional information of users from the position sensors on the basis of predetermined input operation at the time when the user inputs and sends the message. In addition, the information processing system calculates the distance between the users from the positional information of the users, generates display in which the input message and the calculated distance between the users are arranged in association with each other, and sends the display to the information processing terminal 1C. By using the information processing system, the user can transmit the message and the distance between each other at the time of input of the message.

The information processing system according to the third embodiment of the present disclosure may determine an appropriate gathering place for users on the basis of positional information of the users acquired from the position sensors, and display a plurality of places determined to be appropriate as candidate sites for the gathering place. Therefore, the information processing system according to the third embodiment of the present disclosure can propose appropriate gathering places to users.

[4.1. Configuration Example of Information Processing System]

First, with reference to FIG. 10, details of the configuration of the information processing system according to the third embodiment of the present disclosure will be described. FIG. 10 is a block diagram illustrating an internal configuration of the information processing system according to the third embodiment of the present disclosure.

Figure 10:
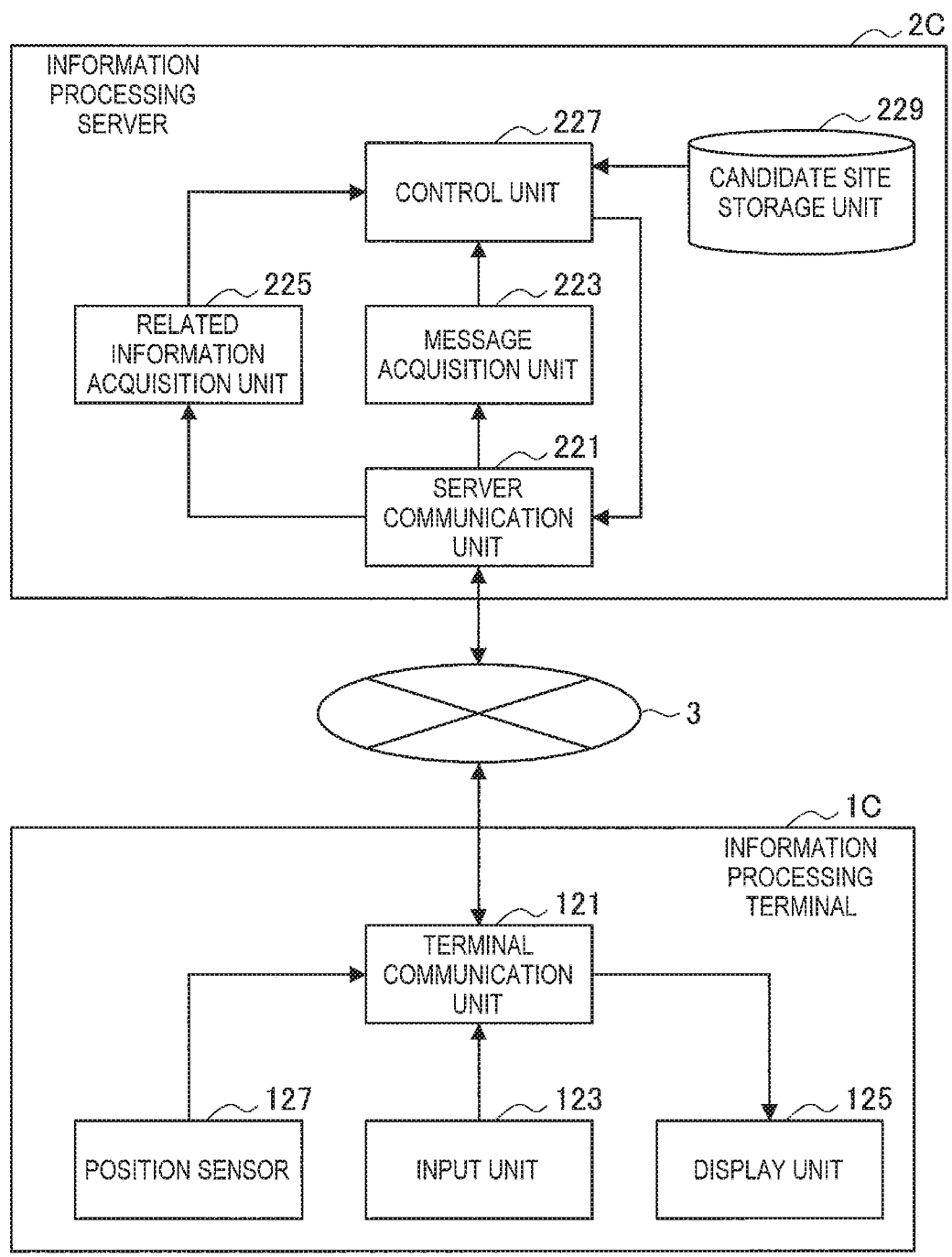
FIG. 10 is a block diagram illustrating an internal configuration of an information processing system according to a third embodiment of the present disclosure.

As illustrated in FIG. 10, the information processing system according to the third embodiment of the present disclosure includes the information processing terminal 1C and an information processing server 2C. The information processing terminal 1C and the information processing server 2C are connected via the network 3. The configuration of the network 3 is substantially similar to FIG. 1. Accordingly, repeated description is omitted here.

The information processing terminal 1C includes a terminal communication unit 121, an input unit 123, a display unit 125, and a position sensor 127. The information processing server 2C includes a server communication unit 221, a message acquisition unit 223, a related information acquisition unit 225, a control unit 227, and a candidate site storage unit 229.

(Configuration of Information Processing Terminal)

The terminal communication unit 121, the input unit 123, and the display unit 125 are similar to the terminal communication unit 101, the input unit 103, and the display unit 105 that have been described in the first embodiment. Therefore, repeated description is omitted here.

The position sensor 127 is a sensor that acquires positional information of a user. Specifically, the position sensor 127 may be a GPS sensor that uses the GPS to acquire positional information of a user. The position sensor 127 may be a sensor that acquires positional information of a base station or an access point that has been used for communication with the network 3, and may determine positional information of a user from positions of the base station or the access point.

Alternatively, the position sensor 127 may be provided at a different information processing terminal (for example, wearable terminal such as glasses-type terminal) from the information processing terminal 1C, and execute a function of the information processing system according to the present disclosure by communicating with the information processing terminal 1C.

A timing when the position sensor 127 acquires positional information of a user may be similar to the timing when the imaging device 107 acquires an image in the first embodiment. Specifically, the position sensor 127 may acquire the positional information when the user orders transmission of an input message, or may acquire the positional information when the user inputs a predetermined character string. Alternatively, the position sensor 127 may acquire the positional information when the user orders acquisition of the information.

(Configuration of Information Processing Server)

The server communication unit 221 and the message acquisition unit 223 are similar to the server communication unit 201 and the message acquisition unit 203 that have been described in the first embodiment. Therefore, repeated description is omitted here.

The related information acquisition unit 225 acquires information related to a user acquired in each information processing terminal 1C. Specifically, the related information acquisition unit 225 acquires positional information of a user acquired by the position sensor 127 when a message is input to each information processing terminal 1C. In other words, in the second embodiment of the present disclosure, the information related to the user means the positional information of the user acquired by the position sensor 127.

The control unit 227 controls information processing to transmit the acquired message on the basis of the information related to the user acquired by the related information acquisition unit 225. Specifically, the control unit 227 calculates distance between users on the basis of positional information of each user acquired by the related information acquisition unit 225, and generates display in which information on distance between the users and a message acquired by the message acquisition unit 223 are arranged in association with each other.

The control unit 227 may determine an appropriate gathering place for users on the basis of positional information of each of the users, and generate display indicating a plurality of places determined to be appropriate as candidate sites for the gathering place. For example, the control unit 227 may determine that a place corresponding to an intermediate position between the users is an appropriate gathering place, and generate display indicating the place as a candidate site for the gathering place. Alternatively, the control unit 227 may determine that a place where one of the users is present is an appropriate gathering place, and generate display indicating the place as a candidate site for the gathering place. Alternatively, the control unit 227 may determine a place where all of the users can easily arrive at as an appropriate gathering place in view of a transportation means (for example, public transportation network such as rail way or bus, or transportation route such as road), and generate display indicating the place as a candidate site for the gathering place.

Alternatively, the control unit 227 may previously set priority levels to places that can be a gathering place, store them in the candidate site storage unit 229, and determine an appropriate place for a gathering place for users on the basis of the priority levels. Specifically, the control unit 227 may preferentially determine a place having a high priority level as an appropriate gathering place, and generate display indicating the place as a candidate site for the gathering place. In the case of displaying a plurality of candidate sites for the gathering place, the control unit 227 may generate display in which a place having a high priority level is emphasized, or may generate display in which the place having the high priority level is arranged at a prominent position such as a top of a list. According to such a configuration, the control unit 227 can generate display to preferentially propose a gathering place where the control unit 227 desires to guide the users.

The priority level set to the place that can be the gathering place may be decided in a manner that a shop that has payed advertisement fee can get a high priority level. Alternatively, for example, the priority level may be decided in a manner that a popular building suitable for a landmark gets a high priority level, or in a manner that a major station or the like where public transportation is concentrated gets a high priority level.

The candidate site storage unit 229 stores candidate sites for a gathering place. The control unit 227 determines an appropriate place for the gathering place for users on the basis of positional information of each of the users from among the candidate sites for the gathering place that are stored in the candidate site storage unit 229. The candidate site storage unit 229 may store the priority level for each of the candidate sites for the gathering place.

[4.2. Operation Example of Information Processing System]

Figure 11A:
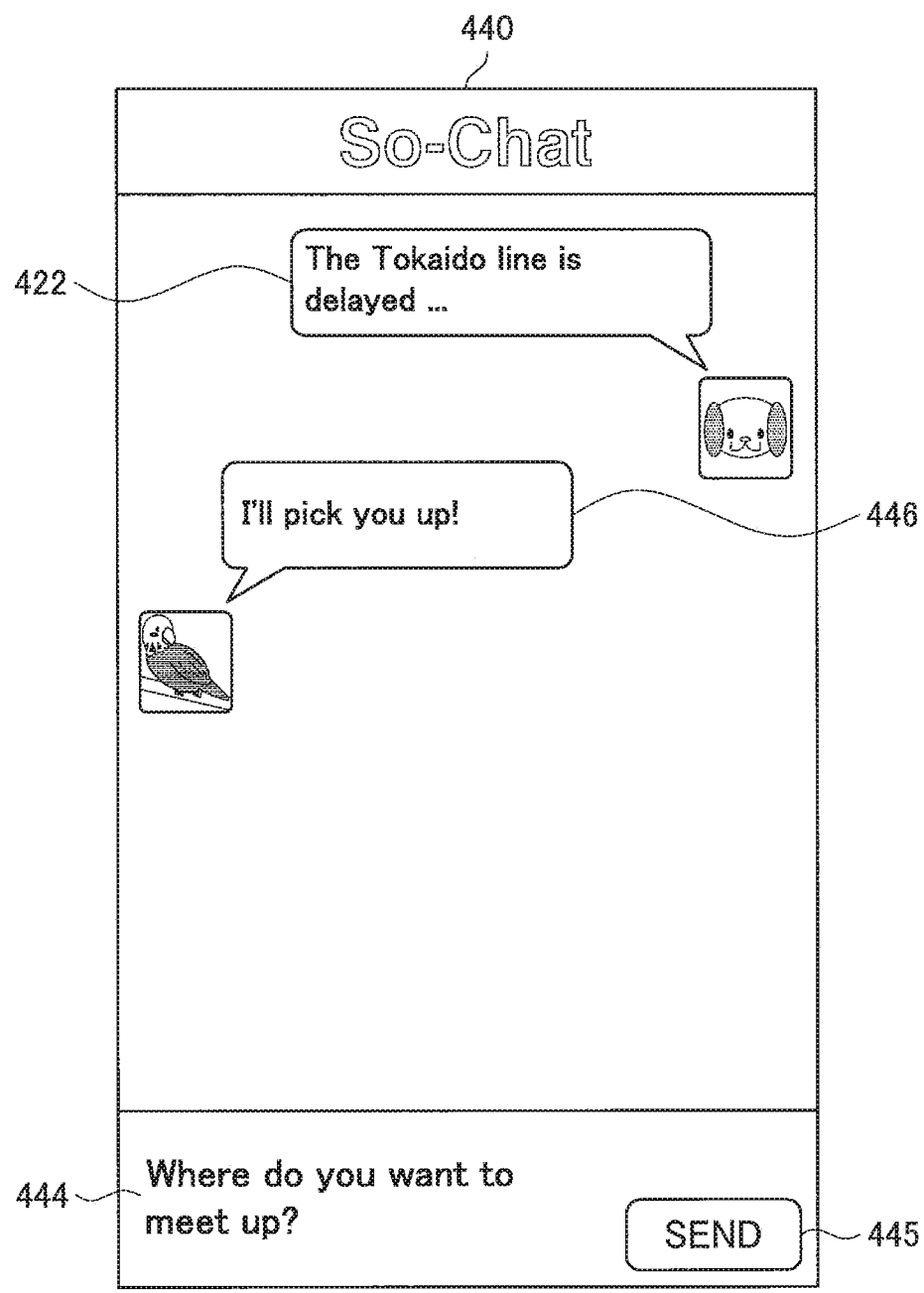
FIG. 11A is an explanatory diagram illustrating an example of display generated by a control unit according to the embodiment.
Figure 11B:
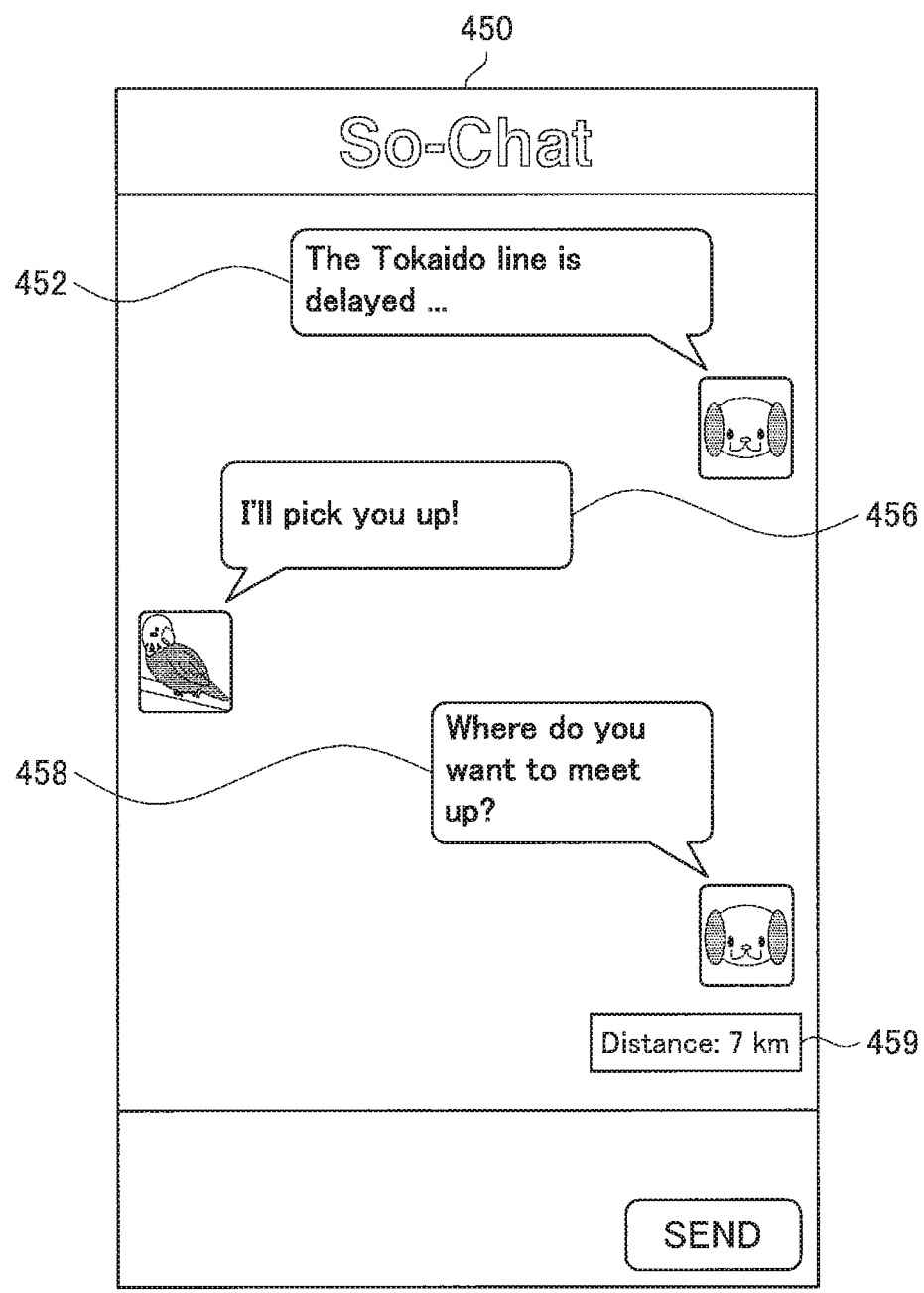
FIG. 11B is an explanatory diagram illustrating an example of display generated by a control unit according to the embodiment.
Figure 11C:
FIG. 11C is an explanatory diagram illustrating an example of display generated by a control unit according to the embodiment.

Next, with reference to FIG. 11A to FIG. 12, an operation example of the information processing system according to the third embodiment of the present disclosure will be described. FIG. 11A and FIG. 11C is each an explanatory diagram illustrating an example of display generated by the control unit 227. FIG. 12 is a flowchart illustrating an operation example of the information processing system according to the third embodiment of the present disclosure.

Hereinafter, operation of the information processing system will be described in line with the flowchart in FIG. 12, with reference to display generated by the control unit 227 in FIG. 11A to FIG. 11C.

Display 440 in FIG. 11A displays a message 442 "The Tokaido line is delayed . . . " that has been sent by a first user, and displays a message 446 "I'll pick you up!" that has been sent by a second user. In response to the message 446, the first user inputs a message "Where do you want to meet up?" in the message input box 444 (S300). Subsequently, the position sensor 127 acquires positional information of the user in the case where the first user presses a send button 445 (S302).

Next, the control unit 227 calculates the distance between the users from the positional information of the users (S304), and generates display in which the input message and information on the calculated distance between the users are arranged in association with each other (S306). Specifically, the control unit 227 generates display 450 illustrated in FIG. 11B. In the display 430 illustrated in FIG. 11B, the message 458 "Where do you want to meet up?" input by the first user is displayed below a message 456 "I'll pick you up!" input by the second user. In addition, distance display 459 "Distance: 7 km" that is the distance between the first user and the second user calculated by the control unit 227 is displayed below the message 458 "Where do you want to meet up?" input by the first user.

In Step S302, the timing when the position sensor 127 acquires positional information of the user is not limited to the above example in a way similar to the first embodiment. The timing may be timing when a button for ordering positional information acquisition is pressed or when a predetermined character string is input.

Next, the control unit 227 determines an appropriate place for the gathering place for the first user and the second user on the basis of positional information of the first user and the second user from among the candidate sites for the gathering place that are stored in the candidate site storage unit 229 (S308).

Next, the control unit 227 generates display indicating a plurality of places determined to be appropriate for the gathering place as candidate sites for the gathering place (S310). Specifically, the control unit 227 generates display 460 illustrated in FIG. 11C. The display 460 in FIG. 11C shows three places including "Shimbashi branch of cafe", "Ginza Sony Building", and "Tokyo station" as the candidate sites for the gathering place for the first user and the second user, and also shows distance between each of the candidate sites and positions indicated by the acquired positional information of the users. The control unit 227 determines that the "Shimbashi branch of cafe" and the "Tokyo station" are appropriate sites as the gathering place since the "Shimbashi branch of cafe" and the "Tokyo station" are each a site where one of the users is present. The control unit 227 determines that the "Ginza Sony Building" is an appropriate site as the gathering place since the "Ginza Sony Building" is at the middle of the positions where the users are present. It is also possible for the control unit 227 to control order or the like of display of the "Shimbashi branch of cafe", "Ginza Sony Building", and "Tokyo station" indicating the candidate sites for the gathering place, on the basis of priority levels of the candidate sites for the gathering place.

As described above, the information processing system according to the third embodiment of the present disclosure can display distance information of users calculated from positional information of the users acquired when a message is input, in association with the input message. Thereby, by using the information processing system according to the third embodiment of the present disclosure, the user can transmit the message and a positional relationship between users at the time of input of the message.

In addition, the information processing system according to the third embodiment of the present disclosure can determine an appropriate gathering place for users on the basis of positional information of the users acquired from the position sensors, and propose candidate sites for the gathering place to the users.

<5. Fourth Embodiment>

Next, with reference to FIG. 13 and FIG. 14, an information processing system according to a fourth embodiment of the present disclosure will be described. The information processing system according to the fourth embodiment of the present disclosure includes an information processing terminal having a plurality of sensors. By using the information processing system, a user can select information to be acquired at the time of input or transmission of a message.

Specifically, the information processing system allows a user to select what kind of information the user wants to acquire or send at the time when the user inputs or sends a message. The information processing system acquires the information selected by the user, generates display in which the input message and the information are arranged in association with each other, and sends the display to the information processing terminal. According to the information processing system, the user can transmit the message and his/her own state at the time of the input of the message by using certain information.

The configuration of the information processing system according to the fourth embodiment is similar to the information processing systems according to the first to third embodiments or the combination thereof. Therefore, repeated description of the detailed configuration of the information processing system is omitted here.

[5.1. Operation Example of Information Processing System]

Next, with reference to FIG. 13 and FIG. 14, an operation example of the information processing system according to the fourth embodiment will be described. FIG. 13 is an explanatory diagram illustrating an example of display generated by the information processing system according to the fourth embodiment. FIG. 14 is a flowchart illustrating an operation example of the information processing system according to the fourth embodiment of the present disclosure.

Hereinafter, operation of the information processing system will be described in line with the flowchart in FIG. 14, with reference to display in FIG. 13 generated by the information processing system.

Figure 13:
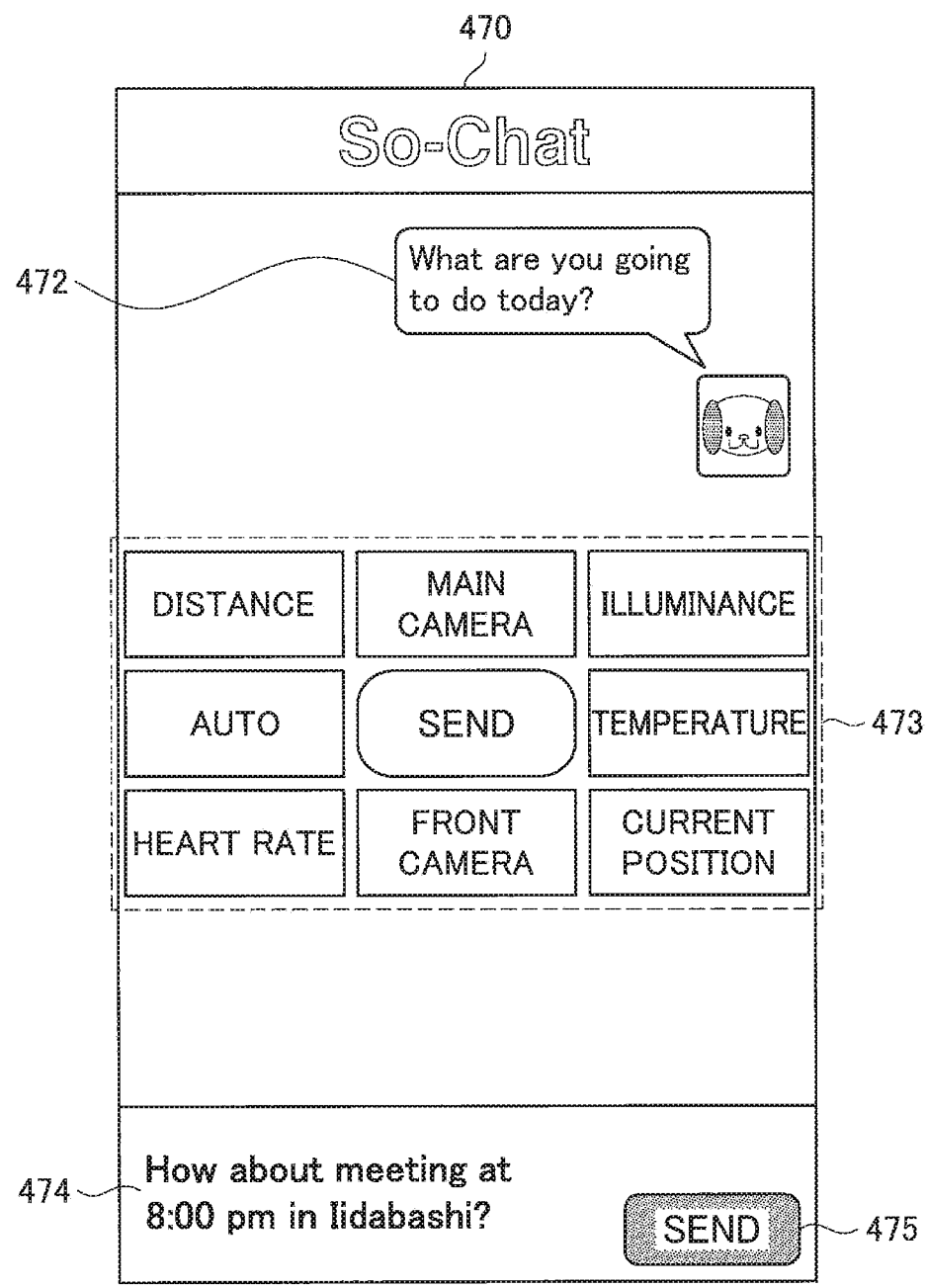
FIG. 13 is an explanatory diagram illustrating an example of display generated by an information processing system according to a fourth embodiment.
Figure 14:
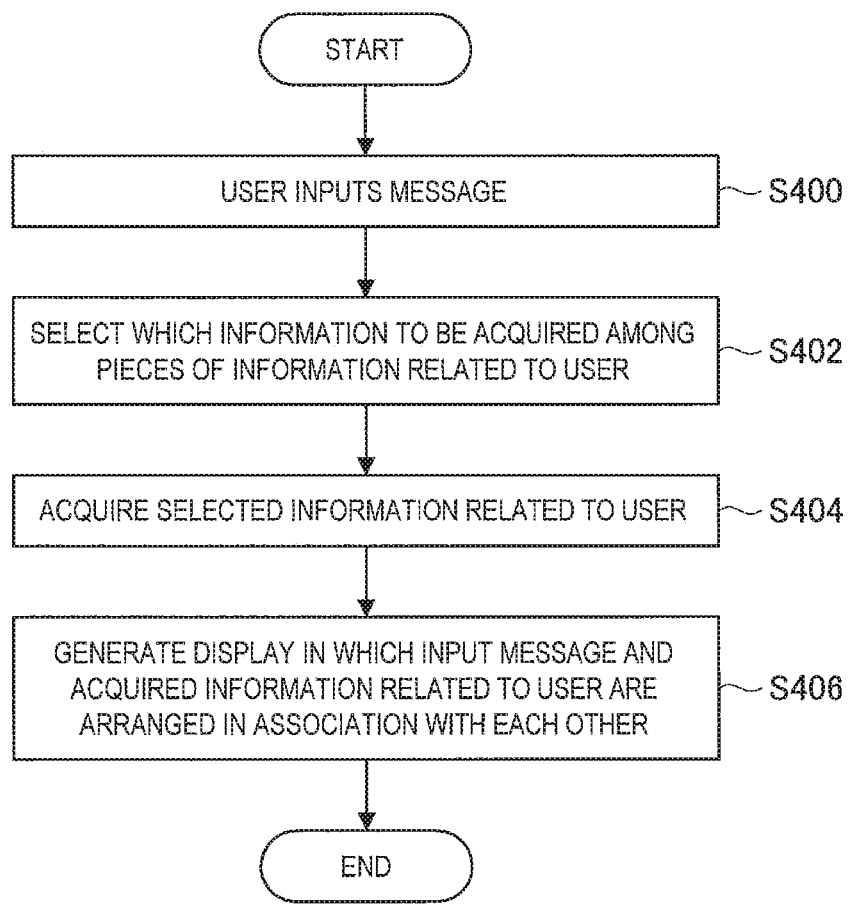
FIG. 14 is a flowchart illustrating an operation example of an information processing system according to the embodiment.

Display 470 in FIG. 13 displays a message 472 "What are you going to do today?" that has been sent by a first user. In response to the message 472, a second user inputs a message "How about meeting at 8:00 pm in Iidabashi?" in a message input box 474 (S400). Subsequently, the information processing system generates selection display 473 for selection of information to be acquired in the case where the second user presses a send button 475. When the second user performs input operation on the selection display 473, information to be sent in addition to a message is selected (S402), and the information processing system acquires information that is selected by the user and that is related to the user (S404). In addition, the information processing system generates display in which the input message and the acquired information related to the user are arranged in association with each other, and causes the information processing terminal to display the generated display.

For example, in the case where a "main camera" or a "front camera" is selected in the selection display 473 illustrated in FIG. 13, the information processing system may execute the operation of the information processing system according to the first embodiment. For example, the "main camera" is an imaging device 107 at a surface different from the display unit 105 in the information processing terminal 1A, and the "front camera" is an imaging device 107 at the same surface as the display unit 105 in the information processing terminal 1A.

In the case where a "illuminance", a "temperature", a "current position", or a "heart rate" is selected in the selection display 473 illustrated in FIG. 13, the information processing system may execute the operation of the information processing system according to the second embodiment.

In the case where a "distance" is selected in the selection display 473 illustrated in FIG. 13, the information processing system may execute the operation of the information processing system according to the third embodiment.

Alternatively, in the case where "auto" is selected in the selection display 473 illustrated in FIG. 13, the information processing system may acquire certain information randomly selected among pieces of information related to a user, and send the certain information in addition to a message.

As described above, by using the information processing system according to the fourth embodiment of the present disclosure, a user can select which information to be acquired or sent from among pieces of information related to the user at the time when the user inputs or sends a message. Thereby, by using the information processing system according to the fourth embodiment of the present disclosure, a user can select appropriate information for transmission of his/her own situation according to the situation, and transmit the information in addition to the message.

<6. Fifth Embodiment>

Next, with reference to FIG. 15 to FIG. 18, an information processing system according to a fifth embodiment of the present disclosure will be described.

Figure 15:
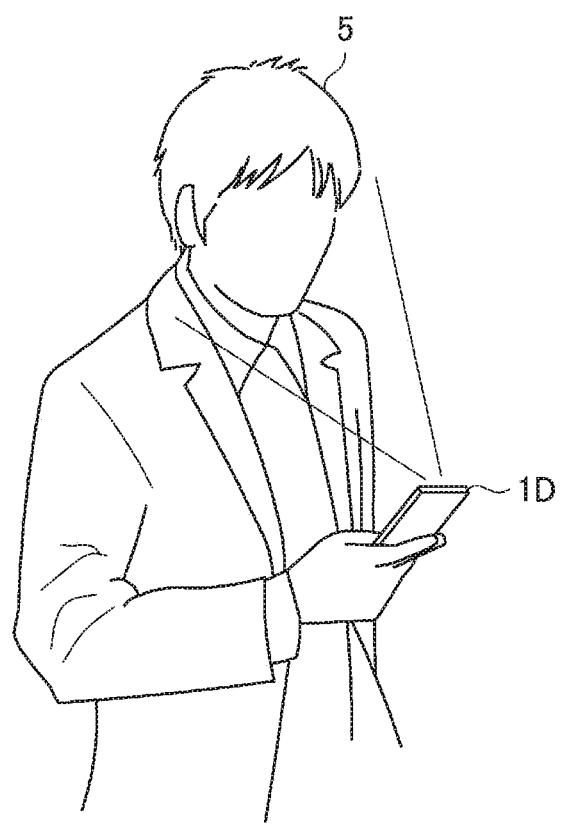
FIG. 15 is an explanatory diagram illustrating an overview of an information processing system according to a fifth embodiment of the present disclosure.

First, with reference to FIG. 15, an overview of the information processing system according to the fifth embodiment of the present disclosure is described. FIG. 15 is an explanatory diagram illustrating the overview of the information processing system according to the fifth embodiment of the present disclosure.

As illustrated in FIG. 15, the information processing system according to the fifth embodiment of the present disclosure includes an information processing terminal 1D provided with an imaging device, and acquire information related to characteristic behavior of a user 5 by using the imaging device. Specifically, the information processing system according to the fifth embodiment of the present disclosure detects characteristic behavior when the user 5 inputs or sends a message by using the imaging device, and controls information processing to transmit the input message on the basis of whether or not the user 5 carries out a predetermined characteristic behavior.

The characteristic behavior of the user may be behavior or facial expression of the user, for example. The information processing system may control the information processing to transmit the input message on the basis of the facial expression of the user 5, such as whether or not the user 5 is smiling, whether or not the user 5 seems to be sad, whether or not the user 5 seems to be angry. In addition, the information processing system may control the information processing to transmit the input message on the basis of whether or not the user is carrying out predetermined behavior (for example, V sign or the like).

Such an information processing system is capable of recognizing characteristic behavior reflecting a mood or feelings of the user at the time of input or transmission of a message, by using the imaging device. Therefore, it is possible to control the information processing to transmit a message on the basis of the recognized characteristic behavior. Thereby, the information processing system according to the fifth embodiment of the present disclosure can transmit a message reflecting a mood or feelings of a user more at the time of input or transmission of the message.

[6.1. Configuration Example of Information Processing System]

Figure 16:
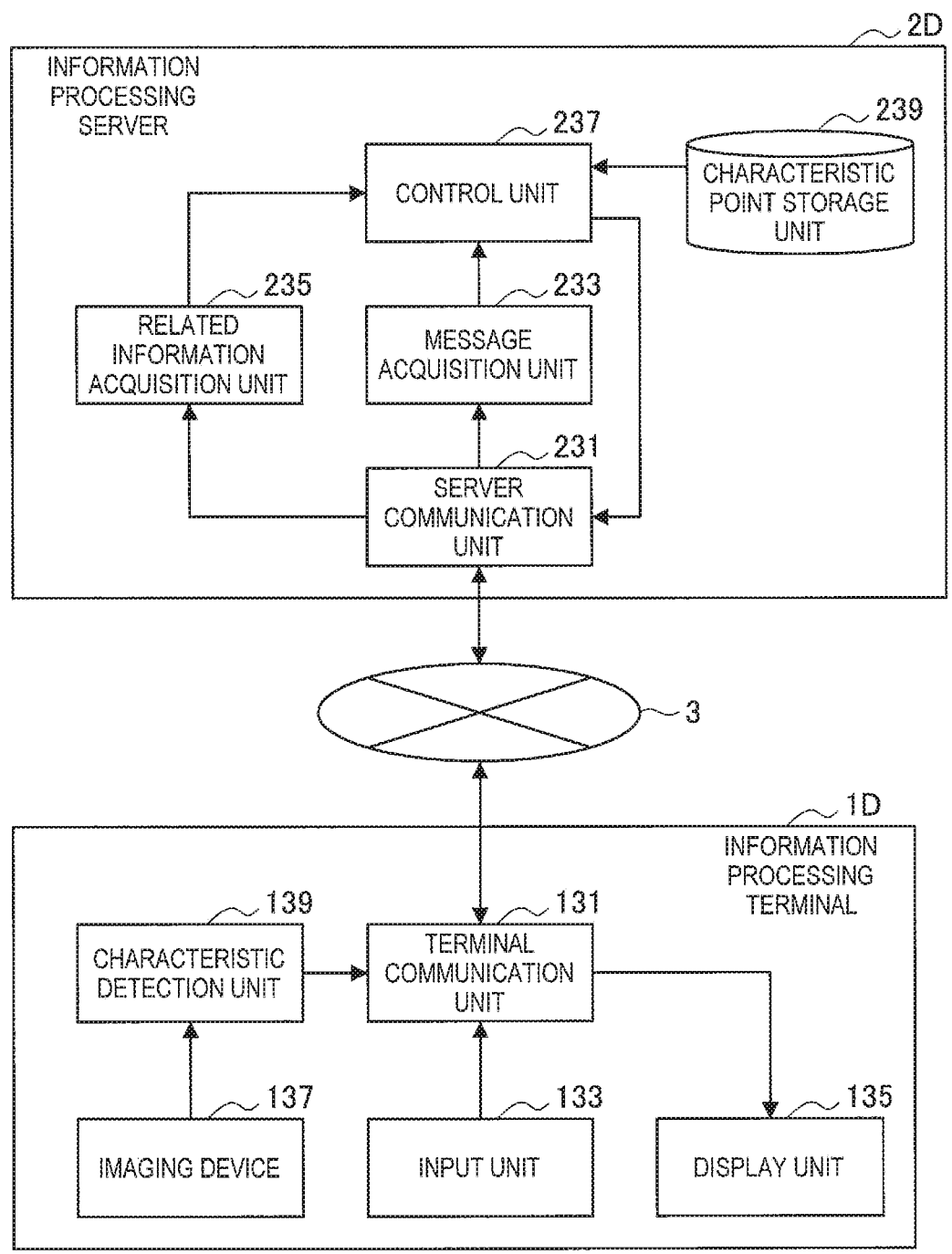
FIG. 16 is a block diagram illustrating an internal configuration of an information processing system according to the embodiment.

First, with reference to FIG. 16, details of the configuration of the information processing system according to the fifth embodiment of the present disclosure will be described. FIG. 16 is a block diagram illustrating an internal configuration of the information processing system according to the fifth embodiment of the present disclosure.

As illustrated in FIG. 16, the information processing system according to the fifth embodiment of the present disclosure includes the information processing terminal 1D and an information processing server 2D. The information processing terminal 1D and the information processing server 2D are connected via the network 3. The configuration of the network 3 is substantially similar to FIG. 1. Accordingly, repeated description is omitted here.

The information processing terminal 1D includes a terminal communication unit 131, an input unit 133, a display unit 135, an imaging device 137, and a characteristic detection unit 139. The information processing server 2D includes a server communication unit 231, a message acquisition unit 233, a related information acquisition unit 235, a control unit 237, and a characteristic point storage unit 239.

(Configuration of Information Processing Terminal)

The terminal communication unit 131, the input unit 133, and the display unit 135 are similar to the terminal communication unit 101, the input unit 103, and the display unit 105 that have been described in the first embodiment. Therefore, repeated description is omitted here.

The imaging device 137 includes an imaging lens, an image sensor, and the like to acquire an image of a subject. Specifically, the imaging device 137 uses the image sensor including the CMOS image sensor or the CCD image sensor, or the like, to perform photoelectric conversion on incident light from the subject via the imaging lens and change the light into an image signal. It is preferable that the imaging device 137 be provided at the same surface as the display unit 135 in the information processing terminal 1D in order to acquire an image used for detecting characteristic behavior of a user who inputs a message.

The characteristic detection unit 139 detects whether or not a user is carrying out characteristic behavior on the basis of an image of the user acquired by the imaging device 137. Specifically, the characteristic detection unit 139 checks the image of the user acquired by the imaging device 137 against preset characteristic behavior such as facial expression or behavior, and determines whether or not the user is carrying out the characteristic behavior.

In the case where it is detected that the user is carrying out the characteristic behavior, the characteristic detection unit 139 may subsequently evaluate a degree or the number of times of the characteristic behavior of the user. Specifically, in the case where the detected characteristic behavior is facial expression such as smile, the characteristic detection unit 139 may evaluate a degree of delight indicated by the smile of the user. In the case where the detected characteristic behavior is behavior or the like, the characteristic detection unit 139 may evaluate a degree of similarity between the behavior of the user and preset behavior. In addition, the characteristic detection unit 139 may evaluate the number of times when the detected characteristic behavior matches predetermined characteristic behavior. The characteristic detection unit 139 may evaluate the degree of the characteristic behavior on numerical values up to 100, or may evaluate the degree of the characteristic behavior on ranks including a plurality of scales, for example.

With reference to FIG. 16, it has been described that the characteristic detection unit 139 is included in the information processing terminal 1D. However, the technology according to the present disclosure is not limited thereto. For example, the characteristic detection unit 139 may be included in the information processing server 2D.

The characteristic detection unit 139 may constantly determine whether or not a user is carrying out characteristic behavior from images of the user acquired by the imaging device 137. Alternatively, it is also possible for the characteristic detection unit 139 to acquire images of a user from the imaging device 137 and determine whether or not the user is carrying out characteristic behavior only while the messaging system is running. Alternatively, it is also possible for the characteristic detection unit 139 to acquire an image of a user from the imaging device 137 and determine whether or not the user is carrying out characteristic behavior only while the user is inputting a message. However, in order to prevent false detection of characteristic behavior and to reduce power consumed in the information processing, it is preferable that the characteristic detection unit 139 acquire an image of a user from the imaging device 137 and determine whether or not the user is carrying out characteristic behavior only while the user is inputting a message.

(Configuration of Information Processing Server)

The server communication unit 231 and the message acquisition unit 233 are similar to the server communication unit 231 and the message acquisition unit 233 that have been described in the first embodiment. Therefore, repeated description is omitted here.

The related information acquisition unit 235 acquires information related to a user acquired in the information processing terminal 1D. Specifically, the related information acquisition unit 225 acquires information related to characteristic behavior of a user at the time of input or transmission of a message in the information processing terminal 1D. In other words, in the fifth embodiment of the present disclosure, the information related to the user means information that has been detected by the characteristic detection unit 139 and that indicates whether or not the user is carrying out characteristic behavior. In addition, the information related to the user may additionally include a result of evaluation of the characteristic behavior of the user.

The control unit 237 controls information processing to transmit a message on the basis of the information related to the characteristic behavior of the user acquired by the related information acquisition unit 235. Specifically, the control unit 237 may newly generate display such as a button used for inputting specific operation in the case where the user is carrying out predetermined characteristic behavior. In addition, in the case where the user is carrying out predetermined characteristic behavior, the control unit 237 may generate display in which a displayed image has been changed into another image.

More specifically, in the case where the control unit 237 detects that a user is smiling, the control unit 237 may generate display of a "send smile button" to send information indicating that the user is smiling in addition to the message. The display of the "send smile button" may be generated instead of display of a "normal send button" to send a message alone, or may be generated in parallel with the display of the "normal send button". Alternatively, the control unit 237 may generate the display of the "send smile button" only while smile of the user is detected, or may generate the display of the "send smile button" during time between detection of smile of the user and transmission of a message.

In the case where the user sends a message by using the "send smile button", the control unit 237 may change display indicating the user who has sent the message (that is, icon indicating user) to another display dedicated to the "send smile". For example, in the case where a message has been sent by using the "send smile button", the control unit 237 may change display (icon) indicating a user who has sent the message to an image of the user smiling.

In the case where the user sends a message by using the "send smile button", the control unit 237 may change a background of the entire display including the sent message to a background dedicated to the "send smile". In the case where the user sends a message by using the "send smile button", the control unit 237 may change a background of the sent message to a background dedicated to the "send smile".

The control unit 237 may control functions that the user can use on the basis of whether or not the user is carrying out predetermined characteristic behavior. Specifically, the control unit 237 may allow the user to use a predetermined function in the case where it is detected that the user is carrying out predetermined characteristic behavior. Conversely, the control unit 237 may prohibit the user from using a predetermined function in the case where it is detected that the user is carrying out predetermined characteristic behavior. Specifically, the control unit 237 may allow the user to use a function of attaching video or the like in the case where it is detected that the user is smiling. On the other hand, the control unit 237 may prohibit the user from using a function of sending a message or the like in the case where it is detected that the facial expression of the user represents anger.

The control unit 237 links the user to a result of evaluation of a degree or the number of times of characteristic behavior of the user. In the case where the result of evaluation linked to the user satisfies a predetermined condition, the control unit 237 may change the information processing for transmitting a message. The user to which the control unit 237 links the result of evaluation of the degree of the characteristic behavior of the user may be a user to whom the message has been sent (that is, user communicating with the user who has carried out the characteristic behavior). However, it is also possible for the control unit 237 to link the user who has sent a message (that is, user who has carried out characteristic behavior) to a result of evaluation of the characteristic behavior of the user.

For example, in the case where a degree or the number of times of characteristic behavior of a user is evaluated on numerical values, the control unit 237 may give, as points, the numerical value of the evaluation result to the user to whom a message has been sent. In the case where accumulated points given to the user exceed a threshold, the control unit 237 may provide a new service or new content to the user. In addition, the control unit 237 may provide a new service or new content to a user in exchange for subtraction of a predetermined value from the accumulated points given to the user.

The characteristic point storage unit 239 stores a link between a user and a result of evaluation of a degree or the number of times of characteristic behavior of the user. Specifically, the characteristic point storage unit 239 stores a user to whom the message has been sent (that is, user communicating with a user who has carried out the characteristic behavior) linked to a result of evaluation of the characteristic behavior of the user. For example, in the case where evaluation of characteristic behavior of a user is represented by a numerical value, the characteristic point storage unit 239 stores, as given points, the numerical value of the result of the evaluation linked to a user to whom a message has been sent. The characteristic point storage unit 239 may accumulate points given to each user, and stores a value of the accumulated points given to each user.

[6.2. Operation Example of Information Processing System]

Next, with reference to FIG. 17 to FIG. 18, an operation example of the information processing system according to the fifth embodiment of the present disclosure will be described. FIG. 17A and FIG. 17B is each an explanatory diagram illustrating an example of display generated by the control unit 237. FIG. 18 is a flowchart illustrating an operation example of the information processing system according to the fifth embodiment of the present disclosure.

Hereinafter, operation of the information processing system will be described in line with the flowchart in FIG. 18, with reference to display generated by the control unit 227 in FIG. 17A and FIG. 17B. In the operation example of the information processing system according to the fifth embodiment of the present disclosure in FIG. 17A to FIG. 18, a smile of a user is detected and the information processing for transmitting a message is changed in the case where the user is smiling.

Figure 17A:
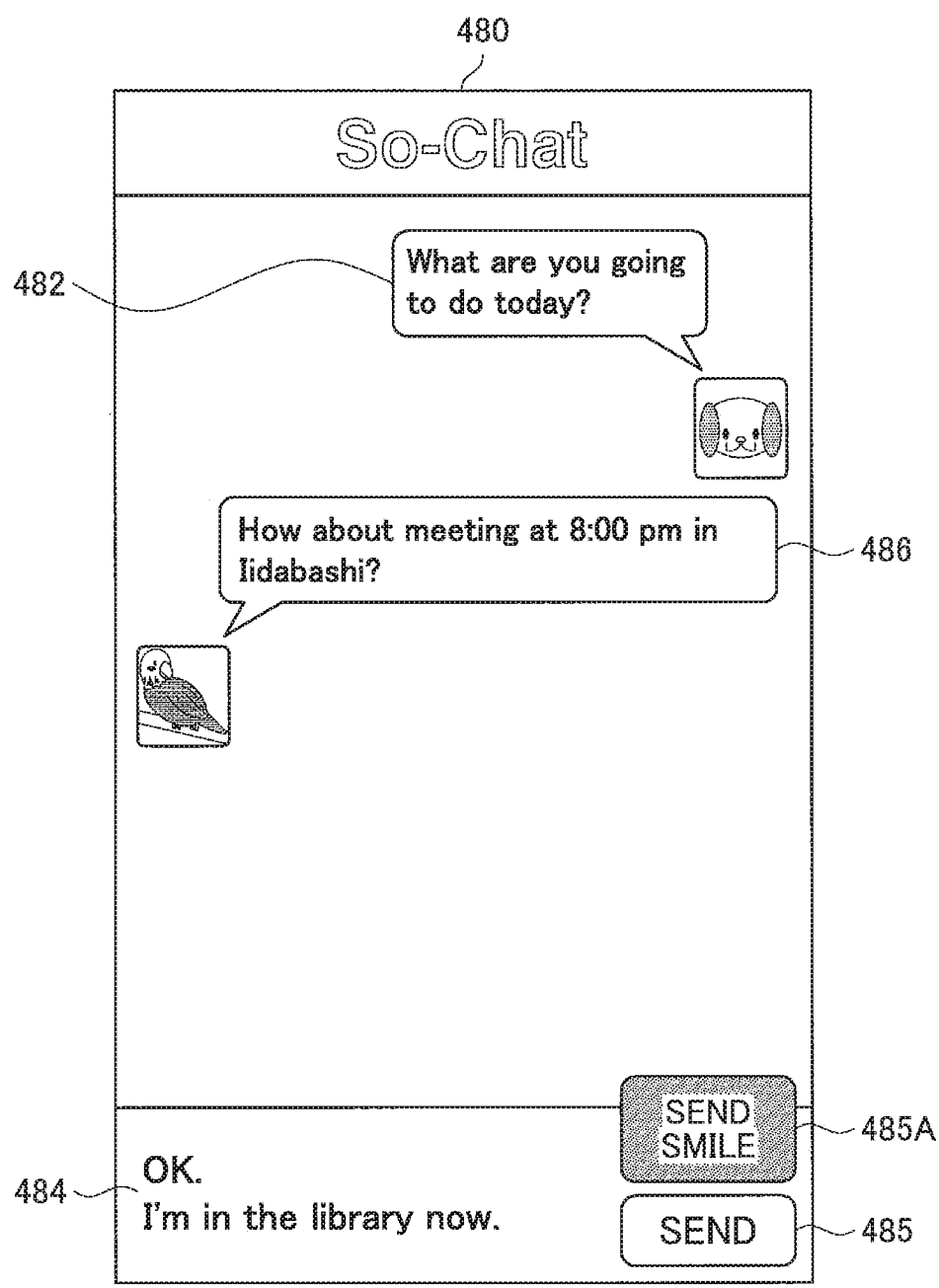
FIG. 17A is an explanatory diagram illustrating an example of display generated by a control unit according to the embodiment.
Figure 17B:
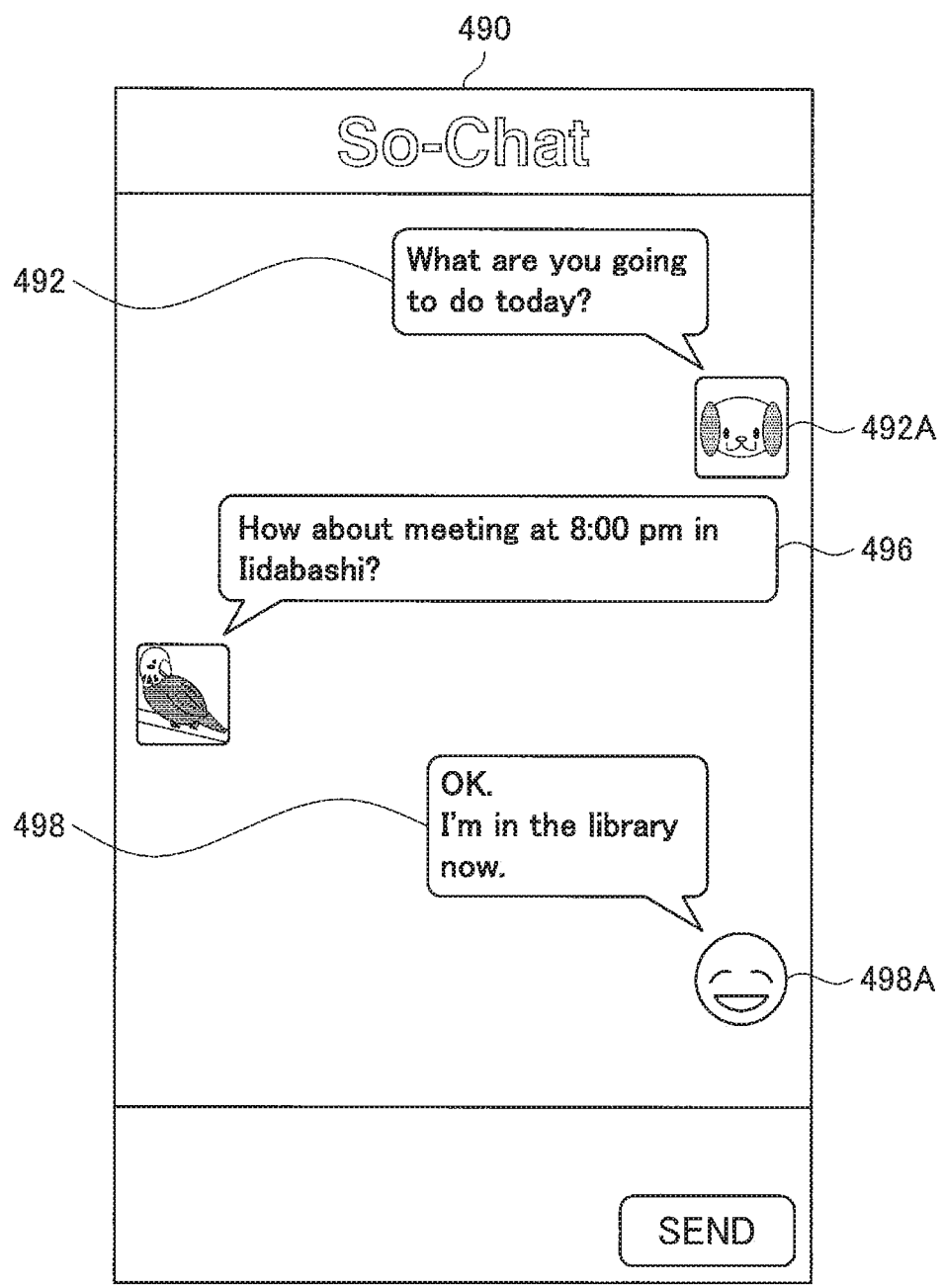
FIG. 17B is an explanatory diagram illustrating an example of display generated by a control unit according to the embodiment.

Display 480 in FIG. 17A displays a message 482 "What are you going to do today?" that has been sent by the first user, and displays a message 486 "How about meeting at 8:00 pm in Iidabashi?" that has been sent by the second user. In response to the message 486, the first user inputs a message "OK. I'm in the library now." in a message input box 484 (S500). The imaging device 137 acquires captured images of the first user as needed (S502), and the characteristic detection unit 139 determines whether or not the user is smiling (in order words, whether or not the user is carrying out predetermined characteristic behavior) from the images of the user acquired by the imaging device 137 (S504).

In the case where the characteristic detection unit 139 determines that the user is not smiling (No in S506), the control unit 237 generates display of a normal send button 485 (S506). Specifically, the control unit 237 generates display obtained by excluding a send "smile" button 485A from the display 480 in FIG. 17A. Subsequently, in the case where the normal send button 485 is pressed, the control unit 237 generates display in which the input message and a normal icon 492A indicating the first user are arranged in association with each other.

On the other hand, in the case where the characteristic detection unit 139 determines that the user is smiling (Yes in S506), the control unit 237 generates display including the send "smile" button 485A in addition to the normal send button 485 (S510).

The control unit 237 determines whether or not the send "smile" button 485A has been pressed (S512). In the case where the user has pressed the "smile" send button 485A (Yes in S512), the control unit 237 generates display in which the input message and a smile icon 498A representing the first user are arranged in association with each other. Specifically, the control unit 237 generates display 490 illustrated in FIG. 17B. In the display 490 illustrated in FIG. 17B, a message 498 "OK. I'm in the library now." input by the first user is displayed below the message 496 "How about meeting at 8:00 pm in Iidabashi?" input by the second user. A message 498 "OK. I'm in the library now." is displayed in a speech balloon from smile icon 498A representing the first user. According to such display, the first user can transmit the message and the fact that the first user has input and sent the message while smiling by using difference between icons representing the user.

On the other hand, in the case where the user has not pressed the send smile button 485A (No in S512), the control unit 237 generates display in which the input message and an icon 492A representing the first user are arranged in association with each other, in a way similar to the case where the normal send button 485 has been pressed (S508).

It may be possible for the control unit 237 to display the send smile button 485A only in the case where the user is smiling, or to continuously display the send smile button 485A until the message is sent when once smile is detected.

As described above, the information processing system according to the fifth embodiment of the present disclosure can detect whether or not a user is carrying out predetermined characteristic behavior on the basis of an image acquired by the imaging device 137. In addition, the information processing system according to the fifth embodiment of the present disclosure controls information processing at the time of transmitting an input message, on the basis of whether or not the user has carried out predetermined characteristic behavior. Thereby, by using the information processing system according to the fifth embodiment of the present disclosure, a user can transmit a message with a mood or feelings of the user at the time of input or transmission of the message.

<7. Hardware Configuration>

Figure 19:
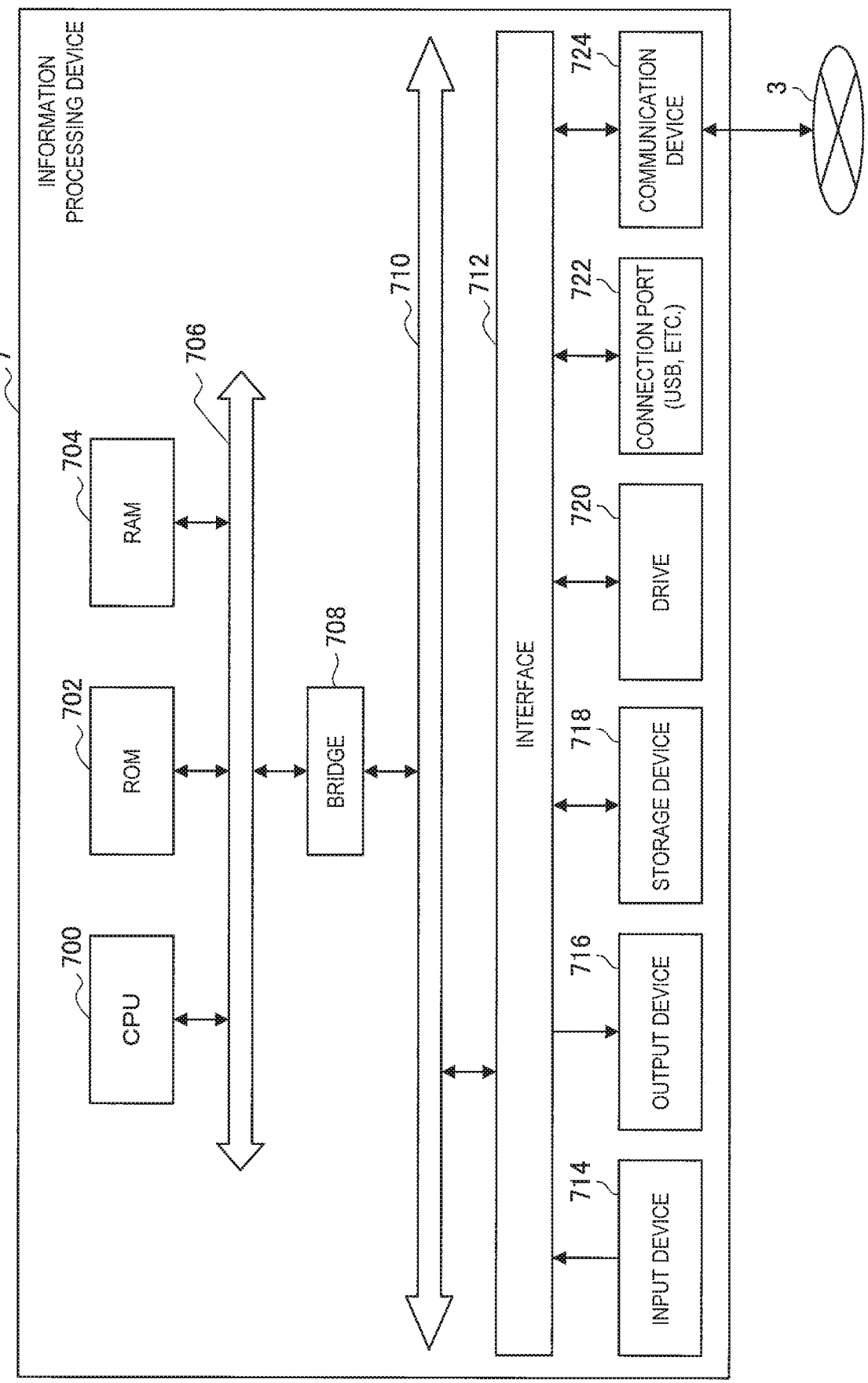
FIG. 19 is an explanatory diagram illustrating a hardware configuration of an information processing device 7 according to each embodiment of the present disclosure.

Hereinafter, with reference to FIG. 19, a hardware configuration of the information processing device 7 that implements the information processing terminal 1 and the information processing server 2 according to each embodiment of the present disclosure will be described. FIG. 19 is an explanatory diagram illustrating a hardware configuration of the information processing device 7 according to each embodiment of the present disclosure. The information processing in the information processing device 7 is achieved by operating cooperatively software and hardware.

As illustrated in FIG. 19, the information processing apparatus 7 includes a central processing unit (CPU) 700, read only memory (ROM) 702, random access memory (RAM) 704, a bridge 708, an internal buses 706 and 710, an interface 712, an input device 714, an output device 716, a storage device 718, a drive 720, a connection port 722, and a communication device 724.

The CPU 700 functions as an arithmetic device and a control device to control all of the operation in the information processing device 7 in accordance with various kinds of programs. The ROM 702 stores programs and arithmetic parameters used by the CPU 700. The RAM 704 transiently stores programs used when the CPU 700 is executed, and parameters that change as appropriate when executing such programs. For example, the CPU 700 executes functions of the blurring control unit 109, the characteristic detection unit 139, the message acquisition units 203, 213, 223, and 233, the related information acquisition unit 205, 215, 225, and 235, and the control unit 207, 217 227, and 237.

The CPU 700, the ROM 702, and the RAM 704 are connected to each other via the bridge 708, and the internal buses 706 and 710. Via the interface 712, the CUP 700, the ROM 702, and the RAM 704 are connected to the input device 714, the output device 716, the storage device 718, the drive 720, the connection port 722, and the communication device 724.

The input device 714 includes a device by which a user inputs information such as a touch screen, and a device to which information is input from an outside such as a sensor. In addition, the input device 714 includes an input control circuit that generates an input signal on the basis of input information and outputs the input signal to the CPU 700. For example, the input device 714 executes functions of the imaging devices 107 and 1037, the sensor unit 117, the position sensor 127, and the input unit 103, 113, 123, and 133.

The display device 716 may include display devices such as an LCD device, an OLED device, a plasma display device, a CRT display device, and a lamp. Further, the output device 716 may include audio output device such as a speaker or headphones. For example, the display device displays a generated image. On the other hand, the audio output device converts audio data or the like into audio and outputs the audio. The output device 716 executes functions of the display units 105, 115, 125, and 135, for example.

The storage device 718 is a device for data storage that is an example of a storage unit of the information processing apparatus 7. The storage device 718 may include a storage medium, a storage device which stores data in the storage medium, a reader device which reads data from the storage medium, a deletion device which deletes stored data, and the like. The storage device 718 executes functions of the image storage unit 219, the candidate site storage unit 229, and the characteristic point storage unit 239, for example.

The drive 720 is a reader/writer for the storage medium, and is incorporated in or externally attached to the information processing device 7. The drive 720 reads information stored in a removable storage medium that is mounted such as a magnetic disk, an optical disc, a magneto-optical disk, or semiconductor memory, and outputs the information to the RAM 704. The drive 720 also writes information to the removable storage medium.

The connection port 722 is a connection interface including a Universal Serial Bus (USB) port and a connection port for connecting an externally connected device such as an optical audio terminal.

The communication device 724 is, for example, a communication interface including a communication device for connection to the network 3. The communication device 724 may be a wireless LAN compatible communication device, or may be a cable communication device performing cable communication in a wired manner. For example, the communication device 724 executes functions of the terminal communication unit 101, 111, 121, and 131, and the server communication unit 201, 211, 221, and 231.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)

An information processing system including:

a message acquisition unit configured to acquire messages input by users;

a related information acquisition unit configured to use an imaging device and acquire information related to the user who has input the message; and a control unit configured to control information processing to transmit the input message on the basis of the information related to the user.

(2)

The information processing system according to (1), wherein the related information acquisition unit automatically acquires the information related to the user on the basis of input operation related to the message.

(3)

The information processing system according to (1) or (2), wherein the control unit transmits the message by generating display in which a related image based on the information related to the user is arranged in association with the message.

(4)

The information processing system according to (3), wherein the related image is an image captured by the imaging device.

(5) The information processing system according to (4), wherein the captured image is an image additionally subjected to a blurring process.

(6) The information processing system according to (5), wherein the imaging device detects a focus position by using an image surface phase difference detection method, and the captured image is an image subjected to a blurring process in a defocusing process of the imaging device.

(7) The information processing system according to (3), wherein the related information acquisition unit acquires the information related to the user by using at least one of the imaging device and a predetermined sensor, and the control unit determines a state of the user on the basis of the information related to the user, and uses an image corresponding to the state of the user as the related image.

(8) The information processing system according to (7), wherein the control unit further determines the state of the user on the basis of a word included in the message.

(9) The information processing system according to (7) or (8), wherein the control unit generates display in which a word corresponding to the state of the user is emphasized, in a case where the word is included in the message.

(10) The information processing system according to any one of (3) to (9), wherein the control unit generates display in which the related image is used as a background of the message.

(11) The information processing system according to (10), wherein the control unit controls a display color of the message on the basis of color information of the related image

(12) The information processing system according to (1), wherein the related information acquisition unit uses a position sensor and acquires positional information of the user as the information related to the user, and the control unit determines distance between the users from the positional information of the users, and transmits the message by generating display in which information on the distance between the users is arranged in association with the message.

(13) The information processing system according to (12), wherein the control unit determines candidate sites for a gathering place for the users on the basis of positional information of the users, and generates display including the candidate sites.

(14) The information processing system according to (13), wherein the control unit further determines a candidate site for the gathering place for the users on the basis of priority levels of the candidate sites.

(15) The information processing system according to any one of (1) to (14), wherein in response to input from the user, the control unit changes the information related to the user to be used for controlling the information processing.

(16) The information processing system according to (1), wherein the related information acquisition unit acquires information on characteristic behavior of the user acquired from the imaging device as the information related to the user.

(17) The information processing system according to (16), wherein the control unit transmits the message by generating display in which an image has been changed on the basis of the information on the characteristic behavior of the user.

(18) The information processing system according to (16) or (17), wherein the control unit determines whether or not to allow the user to use a predetermined function, on the basis of the information on the characteristic behavior of the user.

(19) The information processing system according to any one of (16) to (18), wherein the control unit evaluates a degree or the number of times of the characteristic behavior of the user, links a result of the evaluation of the characteristic behavior to a user to whom the message has been transmitted, and controls the information processing to transmit the message on the basis of the result of the evaluation of the characteristic behavior linked to the user.

(20) The information processing system according to any one of (16) to (19), wherein the control unit numerically evaluates a degree or the number of times of the characteristic behavior of the user, gives a numerical value obtained by the evaluation to a user to whom the message has been transmitted as a point, and determines whether or not to allow the user to use a predetermined function, on the basis of whether or not a cumulative total value of points given to each of the users satisfies a predetermined condition.

(21) An information processing terminal including:

a message acquisition unit configured to acquire a message input by a user;

a related information acquisition unit configured to use an imaging device and acquire information related to the user; and a control unit configured to link and send the information related to the user and the input message.

(22) An information processing method including:

acquiring messages input by users;

using an imaging device and acquiring information related to the user who has input the message; and controlling information processing to transmit the input message on the basis of the information related to the user.

REFERENCE SIGNS LIST

1 information processing terminal
2 information processing server 3 network
101, 111, 121, 131 terminal communication unit
103, 113, 123, 133 input unit
105, 115, 125, 135 display unit
107, 137 imaging device
109 blurring control unit
117 sensor unit
127 position sensor
139 characteristic detection unit
201, 211, 221, 231, server communication unit
203, 213, 223, 233 message acquisition unit
205, 215, 225, 235 related information acquisition unit
207, 217, 227, 237 control unit
219 image storage unit
229 candidate site storage unit
239 characteristic point storage unit

The invention claimed is:

1. An information processing system, comprising:
a camera; and
at least one processor configured to:
acquire a message input by a user;
adjust a shift length of a focus position of the camera to defocus the camera;
control the defocused camera to capture an image associated with the user, wherein
the captured image is blurred;
acquire positional information of the user by use of a positional sensor;
determine a distance between the user and at least one recipient of the message based on the positional information;
transmit the message based on the blurred image, wherein the transmitted message includes information on the distance between the user and the at least one recipient; and
generate a display in which the blurred image is a background of the transmitted message,
wherein the camera is configured to detect the focus position based on an image surface phase difference detection of the captured image.

2. The information processing system according to claim 1, wherein the at least one processor is further configured to:
automatically capture the image associated with the user based on the input of the message.

3. The information processing system according to claim 1, wherein the at least one processor is further configured to:
determine a state of the user based on the captured image associated with the user.

4. The information processing system according to claim 3, wherein the at least one processor is further configured to:
determine the state of the user based on a word included in the message.

5. The information processing system according to claim 3, wherein the at least one processor is further configured to:
generate a display in which a word corresponding to the state of the user is emphasized, wherein the word is included in the message.

6. The information processing system according to claim 1, wherein the at least one processor is further configured to:
control a display color of the message based on color information of the captured image.

7. The information processing system according to claim 1, wherein the at least one processor is further configured to:
determine a plurality of candidate sites for a gathering place for the user and the at least one recipient based on the positional information; and
generate a display which includes the plurality of candidate sites.

8. The information processing system according to claim 7, wherein the at least one processor is further configured to:
determine a candidate site of the plurality of candidate sites for the gathering place for the user and the at least one recipient based on priority levels of the plurality of candidate sites.

9. The information processing system according to claim 1, wherein, in response to an input from the user, the at least one processor is further configured to change the captured image associated with the user.

10. The information processing system according to claim 1, wherein the at least one processor is further configured to:
acquire information on a characteristic behavior of the user based on the image captured by the defocused camera.

11. The information processing system according to claim 10, wherein the at least one processor is further configured to:
transmit the message by generation of a display in which the captured image is changed based on the information on the characteristic behavior of the user.

12. The information processing system according to claim 10, wherein the at least one processor is further configured to:
determine whether the user uses a function, based on the information on the characteristic behavior of the user.

13. The information processing system according to claim 10, wherein the at least one processor is further configured to:
evaluate a degree of the characteristic behavior of the user;
link a result of the evaluation of the characteristic behavior to a recipient of the message; and
transmit the message based on the result of the evaluation of the characteristic behavior linked to the recipient.

14. The information processing system according to claim 10, wherein the at least one processor is further configured to:
numerically evaluate a degree of the characteristic behavior of the user;
assign a numerical value, obtained by the numerical evaluation, to the recipient of the message; and
determine whether the user uses a function, based on the numerical value satisfies a condition.

15. An information processing terminal, comprising:
a camera; and
at least one processor configured to:
acquire a message input by a user;
adjust a shift length of a focus position of the camera to defocus an imaging device;
control the defocused camera to capture an image associated with the user, wherein
the captured image is blurred;
acquire positional information of the user by use of a positional sensor;
determine a distance between the user and at least one recipient of the message based on the positional information;
transmit the blurred image and the message, wherein the transmitted message includes information on the distance between the user and the at least one recipient; and
generate a display in which the blurred image is a background of the transmitted message, wherein the camera is configured to detect the focus position based on an image surface phase difference detection of the captured image.

16. An information processing method, comprising:

acquiring a message input by a user;

adjusting a shift length of a focus position of a camera to defocus the camera;

controlling the defocused camera to capture an image associated with the user, wherein the captured image is blurred;

acquiring positional information of the user by use of a positional sensor;

determining a distance between the user and at least one recipient of the message based on the positional information;

transmitting the message based on the blurred image, wherein the transmitted message includes information on the distance between the user and the at least one recipient; and generating a display in which the blurred image is a background of the transmitted message, wherein the camera is configured to detect the focus position based on an image surface phase difference detection of the captured image.

* * * * *